US012708073B2

(12) United States Patent
Poole et al.

(10) Patent No.: US 12,708,073 B2
(45) Date of Patent: Aug. 18, 2026

(54) LOW PROFILE MOWER

(71) Applicant: Black & Decker, Inc., New Britain, CT (US)

(72) Inventors: Brian E. Poole, Lutherville, MD (US); Matthew Rosenthal, Baltimore, MD (US); David A. Miller, Aberdeen, MD (US); Troy Cayon, Baltimore, MD (US)

(73) Assignee: BLACK & DECKER INC., New Britain, CT (US)

( * ) Notice: Subject to any disclaimer, the term of this patent is extended or adjusted under 35 U.S.C. 154(b) by 712 days.

(21) Appl. No.: 17/896,268

(22) Filed: Aug. 26, 2022

(65) Prior Publication Data

US 2022/0408650 A1 Dec. 29, 2022

Related U.S. Application Data

(63) Continuation of application No. PCT/US2021/019774, filed on Feb. 26, 2021.

(Continued)

(51) Int. Cl.
*A01D 69/02* (2006.01)
*A01D 34/78* (2006.01)

(Continued)

(52) U.S. Cl.
CPC ............ *A01D 69/02* (2013.01); *A01D 34/78* (2013.01); *A01D 34/81* (2013.01); *A01D 2101/00* (2013.01)

(58) Field of Classification Search
CPC ......... A01D 69/02; A01D 34/81; A01D 34/78
See application file for complete search history.

(56) References Cited

U.S. PATENT DOCUMENTS

RE18,944 E 9/1933 Beazley
3,428,328 A 2/1969 Lessig et al.

(Continued)

FOREIGN PATENT DOCUMENTS

CN 105165229 A 12/2015
CN 205489746 U 8/2016

(Continued)

OTHER PUBLICATIONS

JP-2014147353-A—English translation (Year: 2014).*

(Continued)

*Primary Examiner* — Christopher J Sebesta
*Assistant Examiner* — Julia C Tran
(74) *Attorney, Agent, or Firm* — Mannava & Kang, P.C.

(57) ABSTRACT

The present invention is directed to a battery powered mower with a low profile design that minimizes the height of the mower to make the mower easier to operate and store. The low profile design places the cutting blade motor in the center of the deck volute so that it doesn't extend above the volute. Additionally, the batteries do not include a cover and so holes are located within the housing to drain away any water that collects. The invention also covers a simplified manufacturing process for the terminal blocks for the battery and a rear door. Lastly, the invention includes a cable guide to prevent the electrical cable from pinching when the handle is folded for storage.

17 Claims, 33 Drawing Sheets

Related U.S. Application Data

(60) Provisional application No. 62/982,358, filed on Feb. 27, 2020.

(51) Int. Cl.
*A01D 34/81* (2006.01)
*A01D 101/00* (2006.01)

(56) References Cited

U.S. PATENT DOCUMENTS

| | | | | |
|---|---|---|---|---|
| 3,649,828 | A | 3/1972 | Price | |
| 3,696,593 | A | 10/1972 | Thorud et al. | |
| 3,754,385 | A | 8/1973 | Hoffmeyer | |
| 3,755,998 | A | 9/1973 | Hoffmeyer | |
| 3,972,160 | A | 8/1976 | Boswell | |
| 4,224,785 | A | 9/1980 | Hoch | |
| 4,760,687 | A | 8/1988 | Siegrist | |
| 4,869,057 | A | 9/1989 | Siegrist | |
| 4,942,726 | A | 7/1990 | Bowditch | |
| 5,526,633 | A | 6/1996 | Strong et al. | |
| 5,749,209 | A | 5/1998 | Thomason | |
| 5,910,091 | A | 6/1999 | Iida et al. | |
| 6,404,078 | B1 * | 6/2002 | Thomas | H01H 9/06 307/115 |
| 6,606,845 | B1 | 8/2003 | Spies | |
| 6,666,008 | B2 | 12/2003 | Iida et al. | |
| 6,826,895 | B2 | 12/2004 | Iida et al. | |
| 7,143,835 | B2 | 12/2006 | Fukuzumi et al. | |
| 7,584,804 | B2 | 9/2009 | Fukuzumi et al. | |
| 7,741,793 | B2 | 6/2010 | Lucas et al. | |
| 7,884,560 | B2 | 2/2011 | Lucas et al. | |
| 8,069,639 | B2 | 12/2011 | Fancher, III | |
| 8,166,737 | B2 | 5/2012 | Ninomiya et al. | |
| 8,297,032 | B2 | 10/2012 | Ninomiya et al. | |
| 8,347,593 | B2 | 1/2013 | Ito et al. | |
| 8,371,095 | B2 | 2/2013 | Grewe et al. | |
| 8,429,885 | B2 | 4/2013 | Rosa et al. | |
| 8,851,215 | B2 | 10/2014 | Goto | |
| 8,910,459 | B2 | 12/2014 | Abe et al. | |
| 9,206,568 | B2 | 12/2015 | Distefanis, Jr. | |
| 9,787,225 | B2 | 10/2017 | Lucas et al. | |
| 10,485,169 | B2 | 11/2019 | Yamaoka et al. | |
| 2012/0317948 | A1 * | 12/2012 | Abe | A01D 34/828 56/10.5 |
| 2012/0321912 | A1 * | 12/2012 | Hachisuka | H01M 10/425 429/7 |
| 2014/0083072 | A1 | 3/2014 | Edholm et al. | |
| 2016/0115933 | A1 * | 4/2016 | Koenen | H01M 10/02 290/38 R |
| 2016/0353659 | A1 | 12/2016 | Schaedler | |
| 2017/0354087 | A1 * | 12/2017 | Yamagishi | H01M 10/44 |
| 2019/0288255 | A1 * | 9/2019 | Kubota | A01D 34/78 |
| 2020/0315090 | A1 * | 10/2020 | Hasegawa | A01D 34/6806 |
| 2021/0105939 | A1 * | 4/2021 | Zeiler | A01D 34/82 |
| 2021/0329832 | A1 * | 10/2021 | Yamaoka | A01D 34/006 |

FOREIGN PATENT DOCUMENTS

| | | | | |
|---|---|---|---|---|
| CN | 206423165 U | | 8/2017 | |
| EP | 2875712 B1 | | 10/2016 | |
| EP | 3381261 A1 | | 10/2018 | |
| GB | 2328359 A | | 2/1999 | |
| JP | 2003061439 A | | 3/2003 | |
| JP | 2014147353 A | * | 8/2014 | A01D 34/78 |
| WO | 2008015479 A2 | | 2/2008 | |
| WO | 2008048615 A2 | | 4/2008 | |

OTHER PUBLICATIONS

Extended European Search Report, dated Jun. 24, 2024, in corresponding EP application No. 21759778.0-1004/4110037 PCT/US2021019774.

International Search Report in application PCT/US2021/019774, from the Korean Intellectual Property Office mailed on Jun. 9, 2021, 3 pages.

European Patent Office, "Extended European search report for EP Application No. 2020-0138-EP-02-DIV", dated Mar. 2, 2026, 7 pages.

* cited by examiner

LOW PROFILE MOWER

CROSS-REFERENCE TO RELATED APPLICATION

This application is a continuation of PCT Application No. PCT/US2021/019774, filed Feb. 26, 2021, which claims priority to Provisional Patent Application No. 62/982,358, filed Feb. 27, 2020. The entire contents of that application are expressly incorporated herein by reference thereto.

FIELD OF THE INVENTION

The present disclosure relates to an electric battery powered outdoor lawn mower with a low profile.

BACKGROUND OF THE INVENTION

This section provides background information related to the present disclosure which is not necessarily prior art.

Electric battery powered outdoor lawn mowers are known in the art. These mowers typically use removable batteries that power the cutting blade motor and drive wheel motor (if applicable).

Electric mowers have gained in popularity in recent years because of their convenience and ease of use over gas powered mowers. Electric mowers eliminate the need for messy gasoline and oil, and requires less maintenance. Additionally many gas mowers have a pull cord starter as compared to a push button start of an electric mower.

Furthermore, having removable batteries allow for the easy recharging of the battery. The batteries can be small and portable so that they can be transported from the garage to the home, and eliminate the need to go to gas stations.

Many battery powered electric mowers position the batteries centrally above the mower deck, mimicking the look of traditional gas powered mowers. The batteries are typically placed inside a housing with a closable door to protect the batteries from water and other outdoor contaminants. These battery housings protrude upwardly from the deck and create large obstacles that can make maneuvering around or under bushes or other structures more difficult. These large battery housings also require increased use of plastic materials which leads to increased manufacturing costs.

A further issue with battery powered mowers is that the electrical cables must be run between the motor and the battery and controls. The cables are run from the motor to the user controls on the handle, and are secured to the handle with plastic ties. When the mowers are folded into a storage position, the handles are folded over the deck and the cables are often "pinched" by the handles. Repeated pinching of the cables can damage the cable.

BRIEF SUMMARY OF THE INVENTION

In accordance with one aspect of the invention, a battery powered mower includes a low profile design that minimizes the height of the mower to make the mower easier to operate and store. The low profile design places the cutting blade motor in the center of the deck volute so that it doesn't extend above the volute. The batteries are angled into the volute to further minimize the height.

The batteries for the mower are held by a housing that is placed over the deck. The housing provides a pocket for the batteries to sit in, but does not include a cover, so the batteries are exposed to the environment. Drainage holes are located within the housing so that any water that collects in the housing has a means of egress. The advantage of not including a cover is that again lowers the overall height of the mower and reduces the manufacturing cost.

In another aspect of the invention, the manufacturing of the mower is simplified by securing the terminal block for the battery on a pair of rails, and then sliding this subassembly onto grooves molded into the housing. Current plastic manufacturing processes pose challenges with obtaining specific geometry for the tooling needed for the parts. The present solution provides a simplified battery mounting geometry with low cost tooling in two separate parts (no slides, collapsing cores or other intricate tooling design needed). This design also maintains the vertical structural support by using an interlocking rail system where previous designs relied on fasteners to support the battery rail system.

In another aspect of the invention, the assembly of the mower is improved by securing the rear door of the mower to the housing, and then securing the housing and rear door to deck. By attaching the rear door to the housing first, the complexity of the assembly process is reduced. The rear door spring requires a large pre-load in order to comply with regulatory requirements. Typically, a person assembling the unit must hold the rear door assembly (rear door, pivot rod, and pre-loaded spring) to the deck while the housing is moved into place. Since this assembly is pre-loaded with a high spring force it causes the process to be very difficult. The method of the present invention separates the traditional process into two separate steps. First the rear door assembly (rear door, pivot rod, spring) is assembled to the housing with the pre-loaded spring leg in the housing (the spring leg attached to the housing is what allows the assembly to be separated from the deck). The housing design is such that it prevents the assembly from wanting to naturally separate with the spring force. The second step then brings the rear door assembly to the deck for final assembly.

In yet another aspect of the invention, the deck of the mower includes a cable guide adjacent the handle. Electrical cables are run from the motor up the handle pole to the user controls on the handle. When the handle is folded over the housing for storage, the handles tend to "pinch" and damage the cable. The cable guide secures the cable away from the pinching location reduces the likelihood of damage.

BRIEF DESCRIPTION OF THE INVENTION

Further features and advantages of the present invention will be better understood by reference to the following description, which is given by way of example and in association with the accompanying drawings, in which.

DETAILED DESCRIPTION OF THE INVENTION

Figure 1:
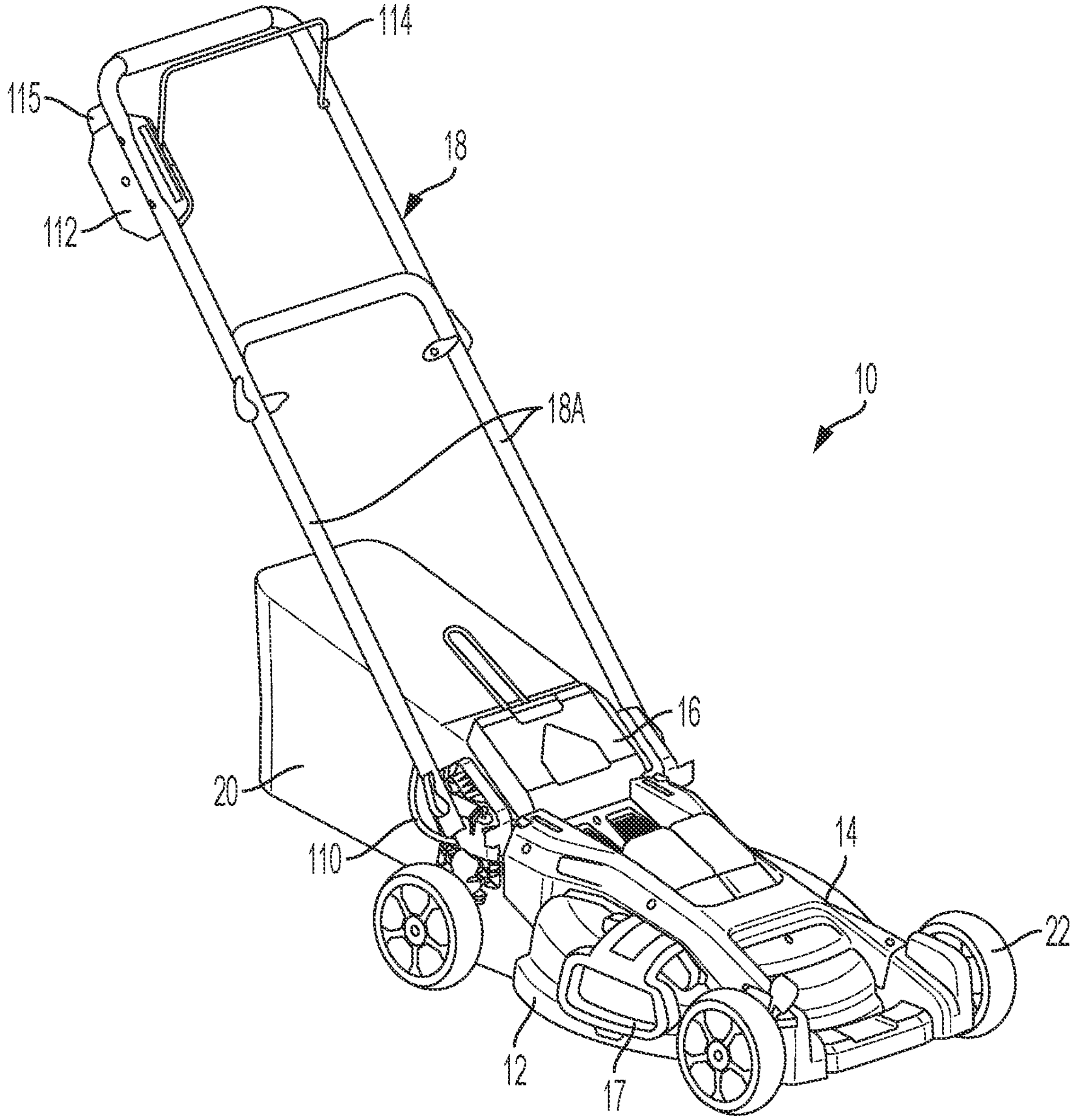
FIG. 1 is a perspective view of the mower of the present invention.
Figure 2:
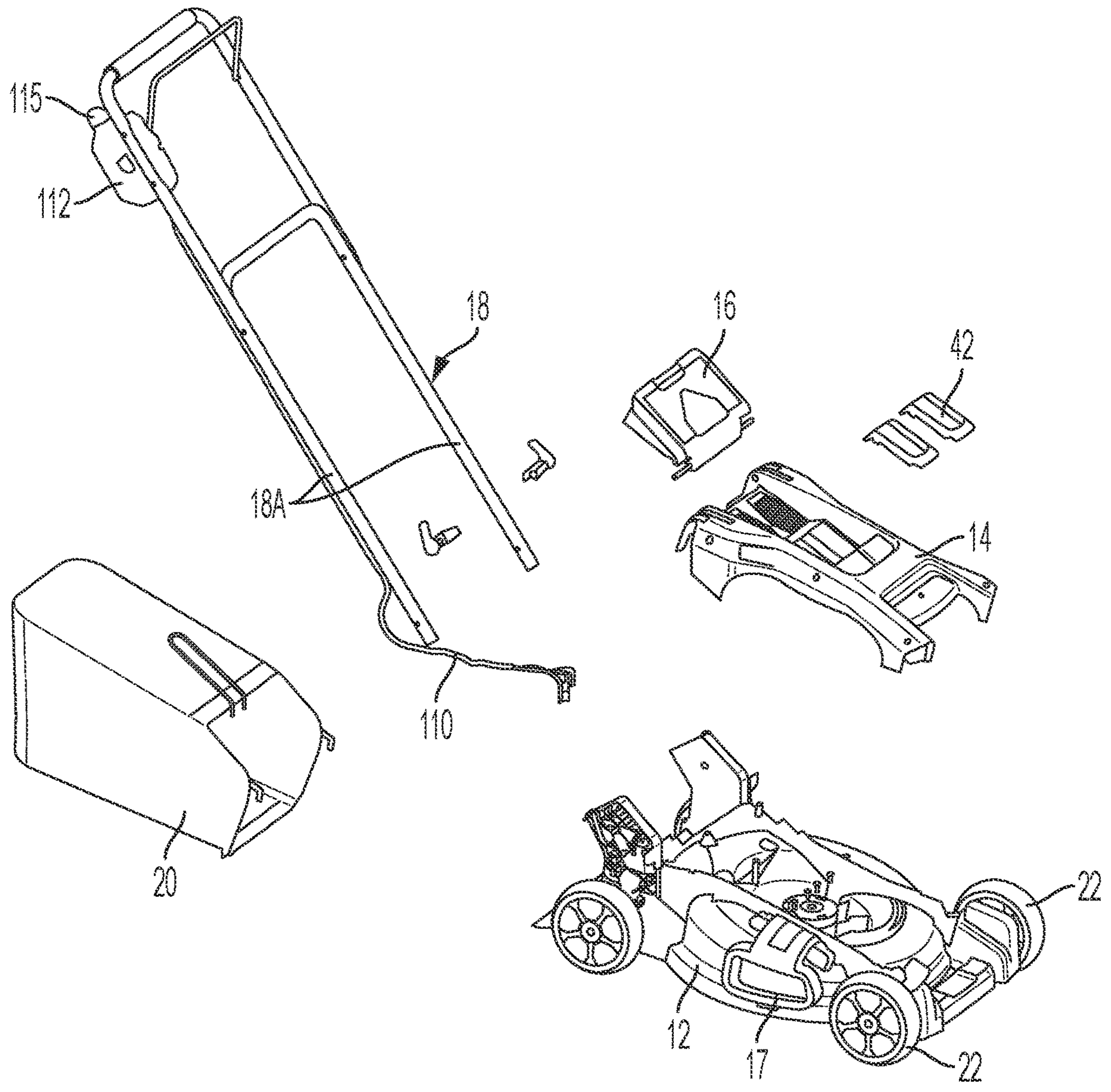
FIG. 2 is an exploded view of the mower of FIG. 1.

FIG. 1 shows an electrically powered mower 10 as contemplated by the present invention and FIG. 2 shows an exploded view of the mower of FIG. 1. The mower 10 includes a deck 12 that is supported on the ground by four wheels 22. A housing 14 covers the deck 12 and a handle 18 is connected to the rear of the deck 12 by two pole sections 18A.

A rear chute door 16 is secured at the rear of the mower which can be opened and closed. In the open position, as shown in FIGS. 1 and 2, a collection bag 20 is attached to catch any grass clippings or other debris cut and expelled by the mower. When the chute door 16 is closed, the grass clippings are trapped within the deck 12 and the grass clippings are mulched. A side chute door 17 is also provided so that the user can expel the grass clippings without mulching if desired.

Figure 3:
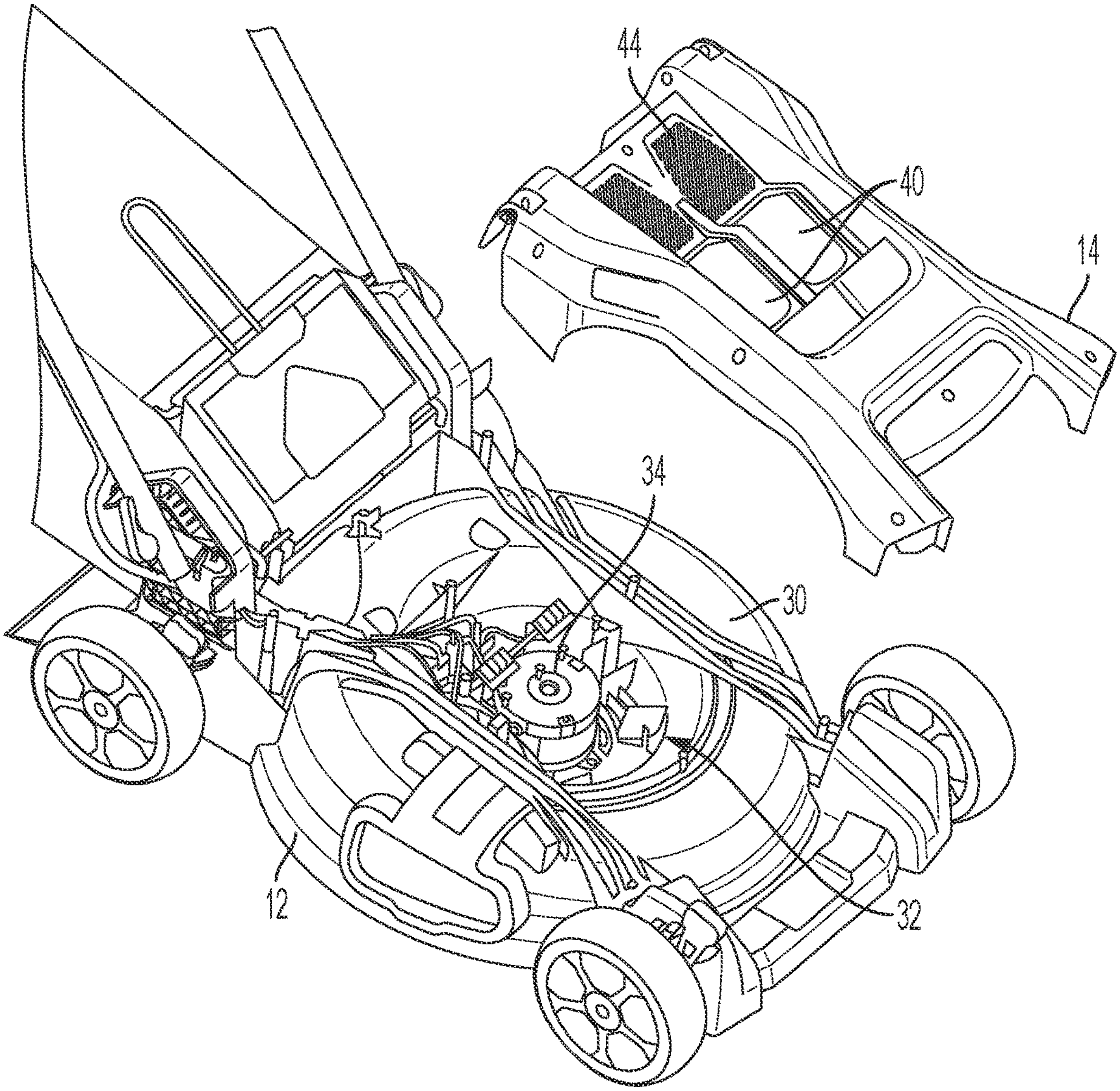
FIG. 3 is perspective view of the mower deck with the housing removed.
Figure 4:
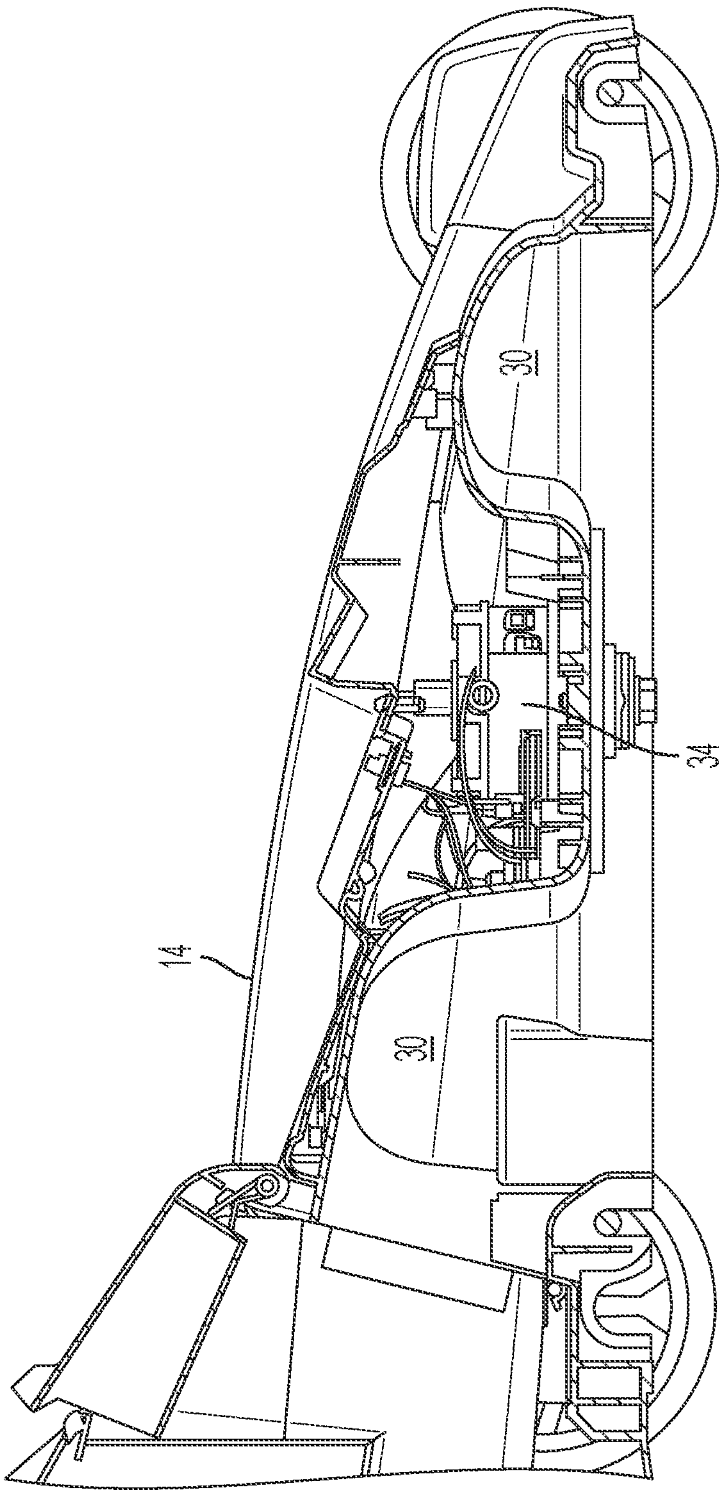
FIG. 4 is a side sectional view of the mower showing the motor.

Referring now to FIGS. 3 and 4, the deck 12 is formed by a circular volute 30 with a hole or cavity 32 in the center. A motor 34 for driving a cutting blade is secured within the cavity 32 so that it's wholly contained within the cavity. In other words, the height of the motor 34 does not extend above the height of the volute 30. This allows for the efficient use of space and reduces the overall height of the mower.

Figure 5:
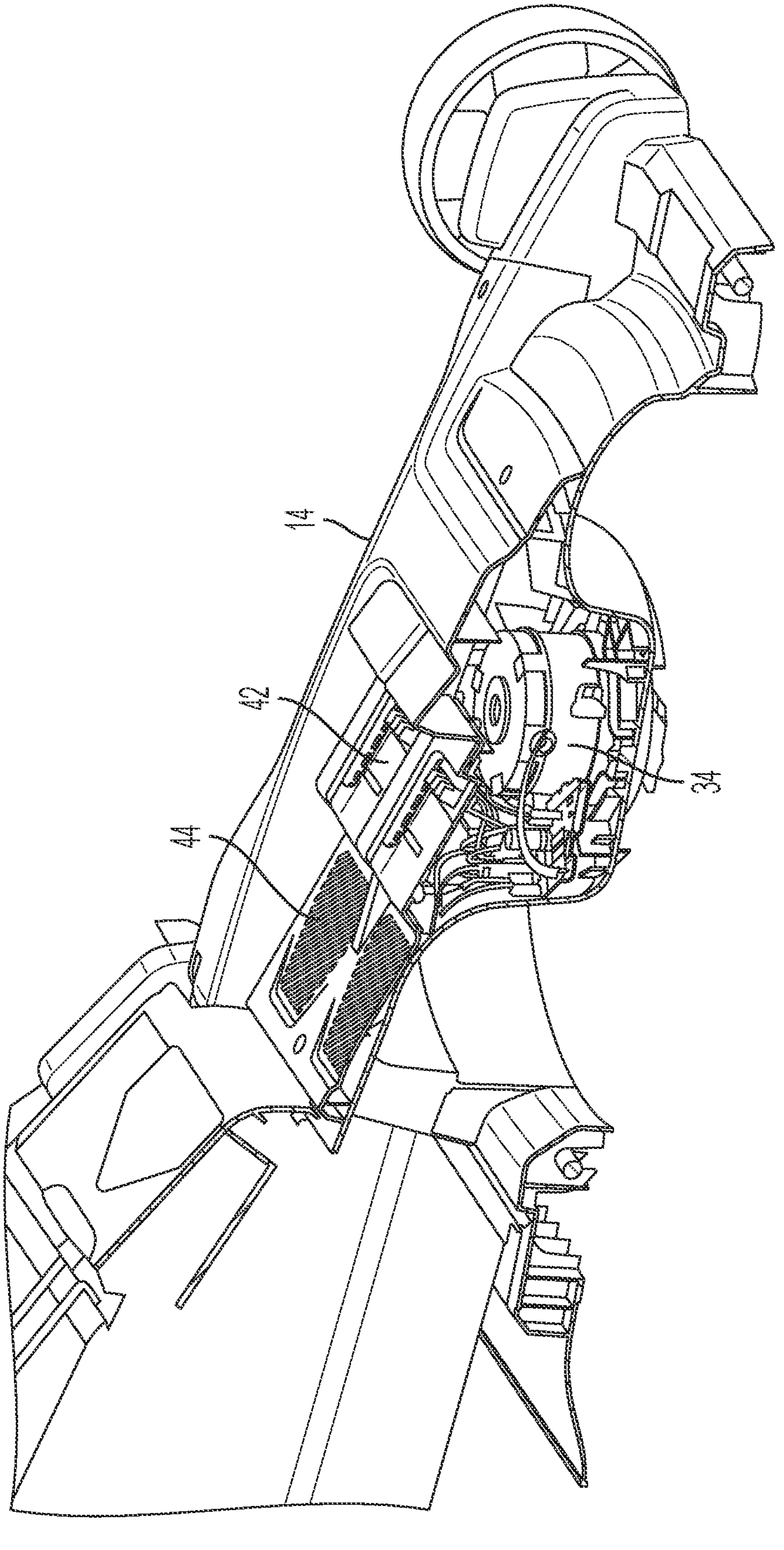
FIG. 5 is a perspective cut-away view of the mower.
Figure 6:
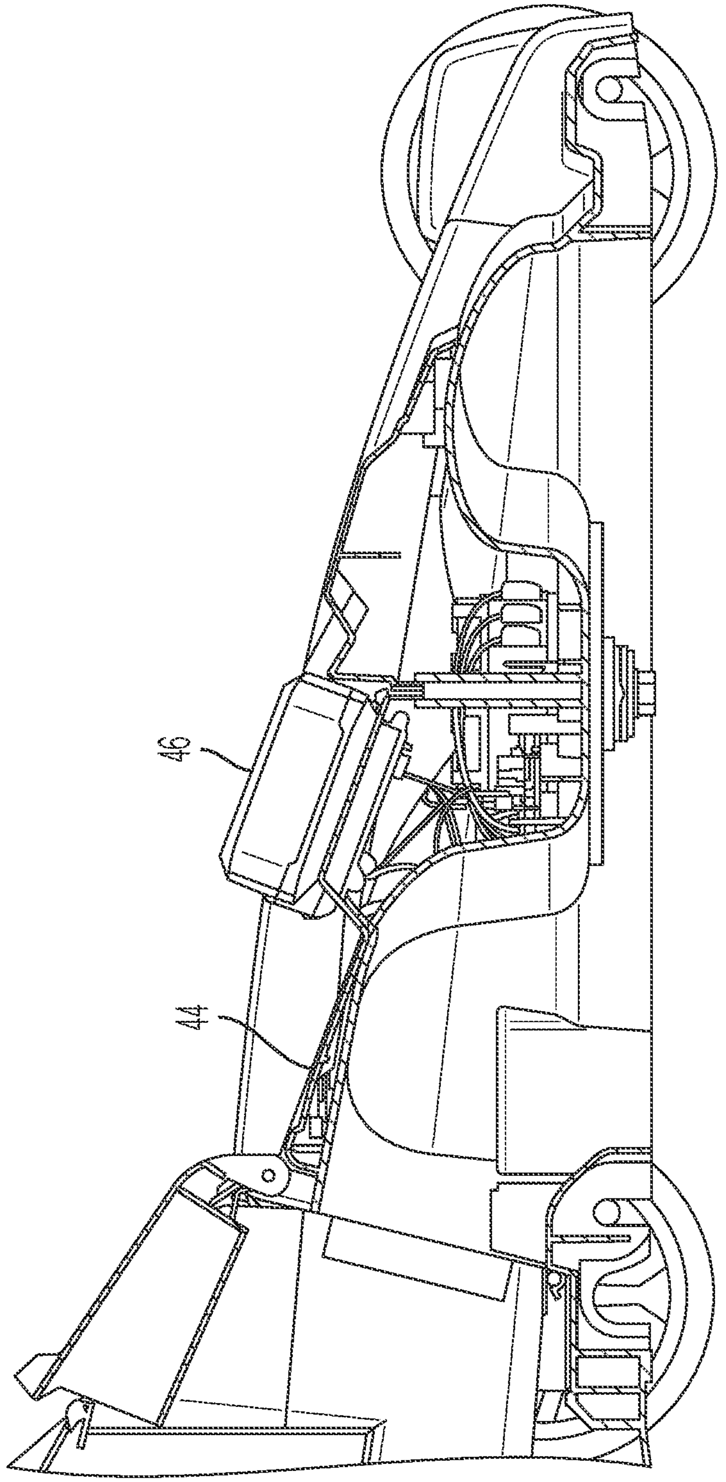
FIG. 6 is a side sectional view similar to FIG. 4, with the batteries.
Figure 9:
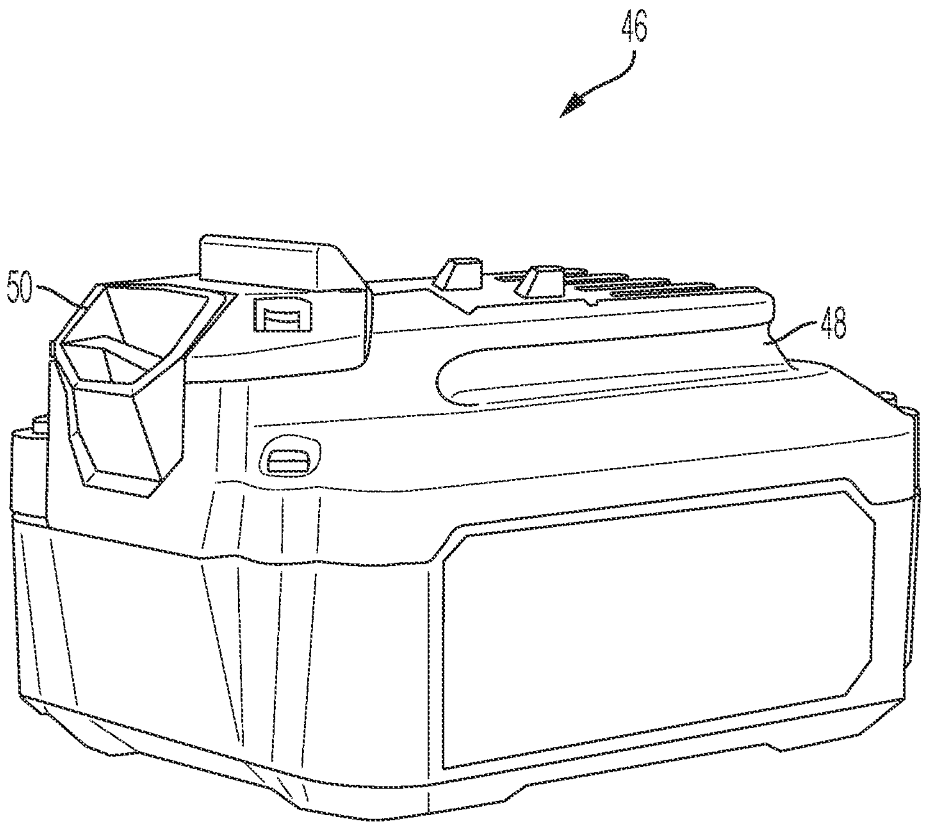
FIG. 9 is an exemplary battery that can be used with the present mower.
Figure 10:
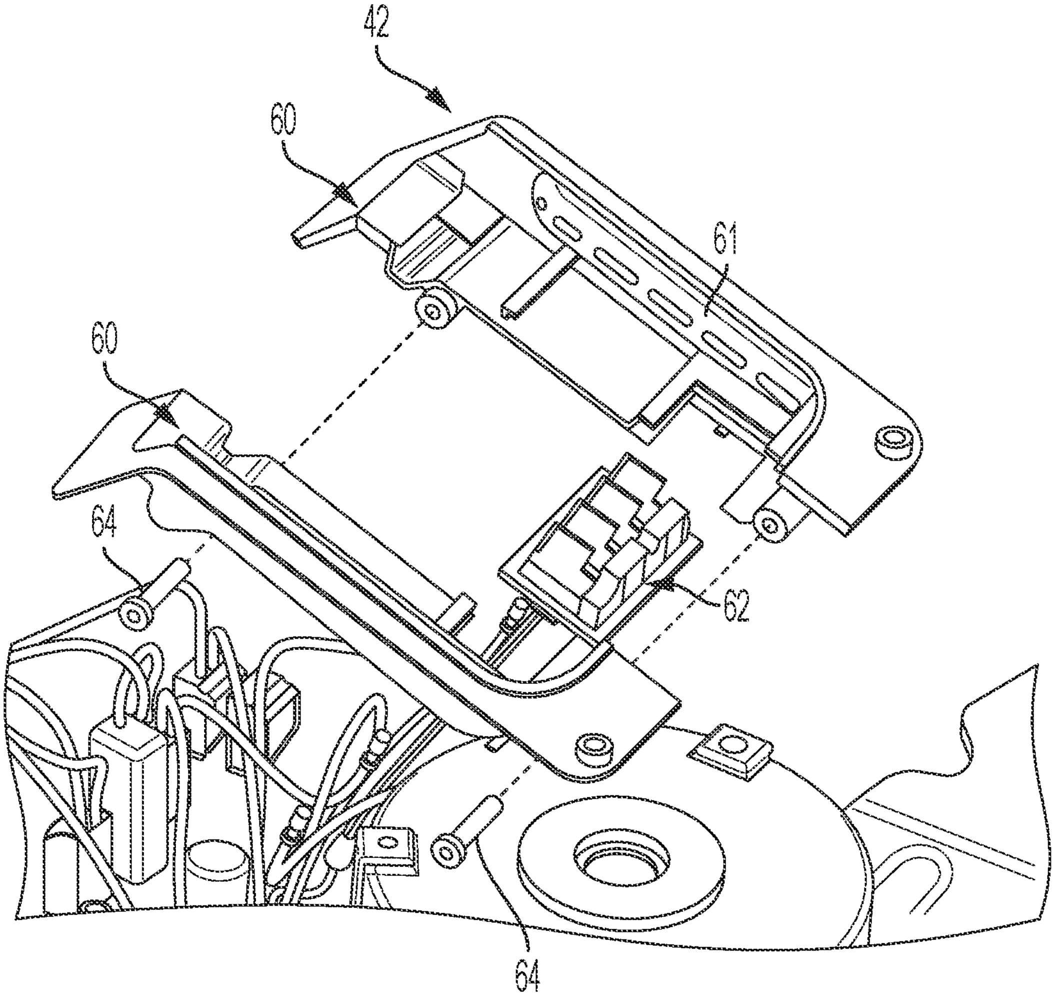
FIG. 10 shows the battery connector subassembly.

Referring now to FIG. 3, the housing includes two openings 40 for battery connectors 42 (shown in FIG. 2). To the rear of the openings 40 are two corresponding access pads 44. As can be seen best in FIGS. 4-6, the battery connectors 42 and access pads 44 are angled upward from front to rear. FIG. 6 shows the inserted batteries 46, which are slid onto the battery connectors 42 from the rear. FIG. 9 shows an exemplary battery 46 having a groove 48, which correspond to a tongue or rail 61 on the battery connector 42 (FIG. 10). At the rear of the battery 46 is an interlock lever 50 that locks the battery to the battery connector 42.

In order to minimize the height of the mower, the batteries 46 are inserted from the rear of the mower (as opposed to dropped in from the top). It is for this reason that the battery connector 42 and access pad 44 are angled so the user can access the battery 46 more easily. To further improve access to the battery, the access pads 44 are formed below the battery connectors 42 to provide access to the bottom of the battery making it easier for a user to grasp.

As can be seen in FIG. 4, without the batteries the upper surface of the housing 14 forms the topmost surface of the mower. FIG. 6 shows the mower with the batteries 46, with the batteries 46 slightly protruding above the height of the housing 14. The extent that the batteries extend above the housing 14 will depend on the size of the battery, with batteries coming in different physical sizes depending on its energy capacity (for example a 2 amp-hr. battery vs. a 4 amp-hr. battery). Therefore, a battery with a low energy capacity could be small enough to stay below the housing. But even so, the configuration in the present invention reduces the height of the mower as compared to mowers where the batteries that are dropped in from the top.

Figure 7:
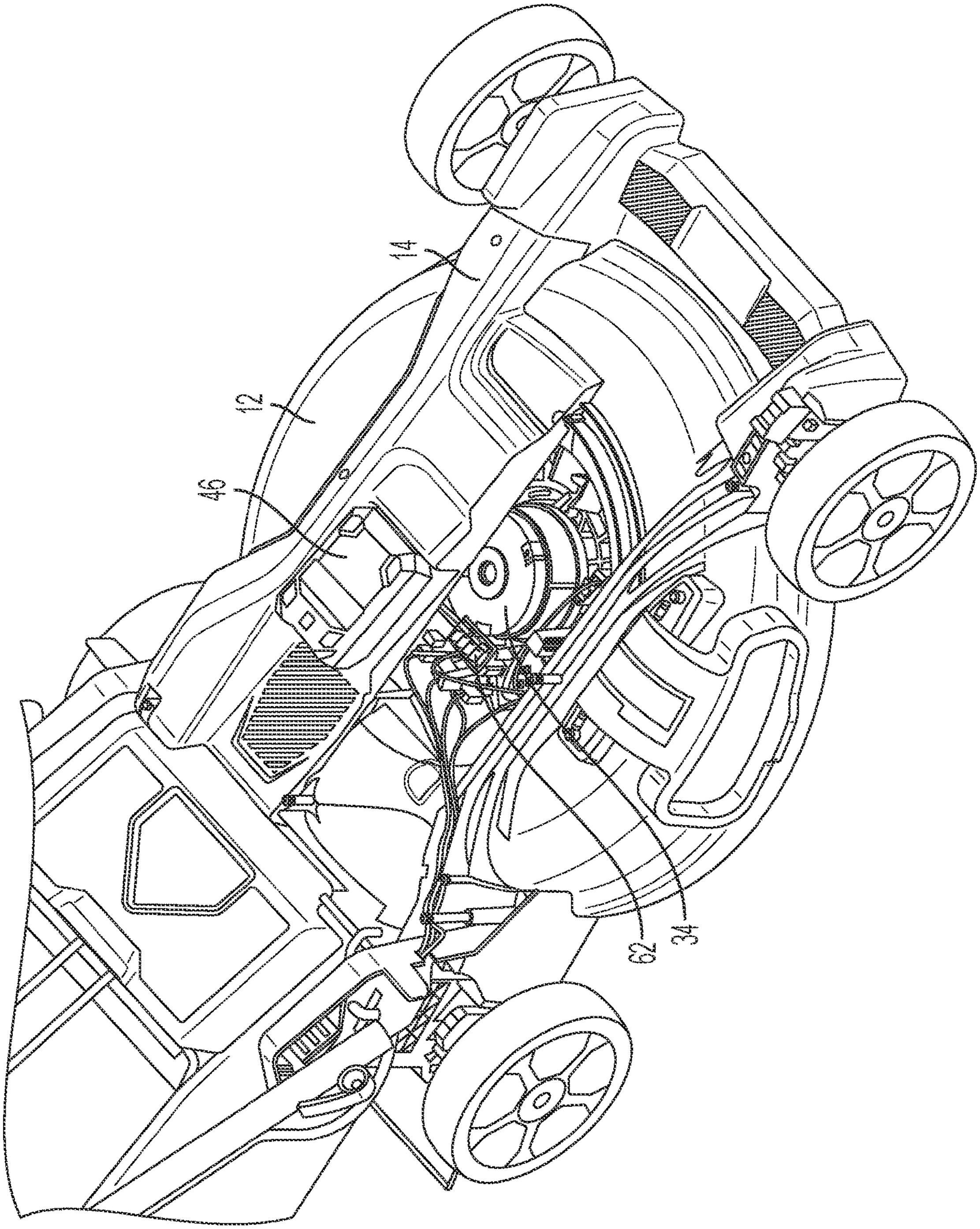
FIG. 7 is a perspective view of the mower with the batteries.
Figure 8:
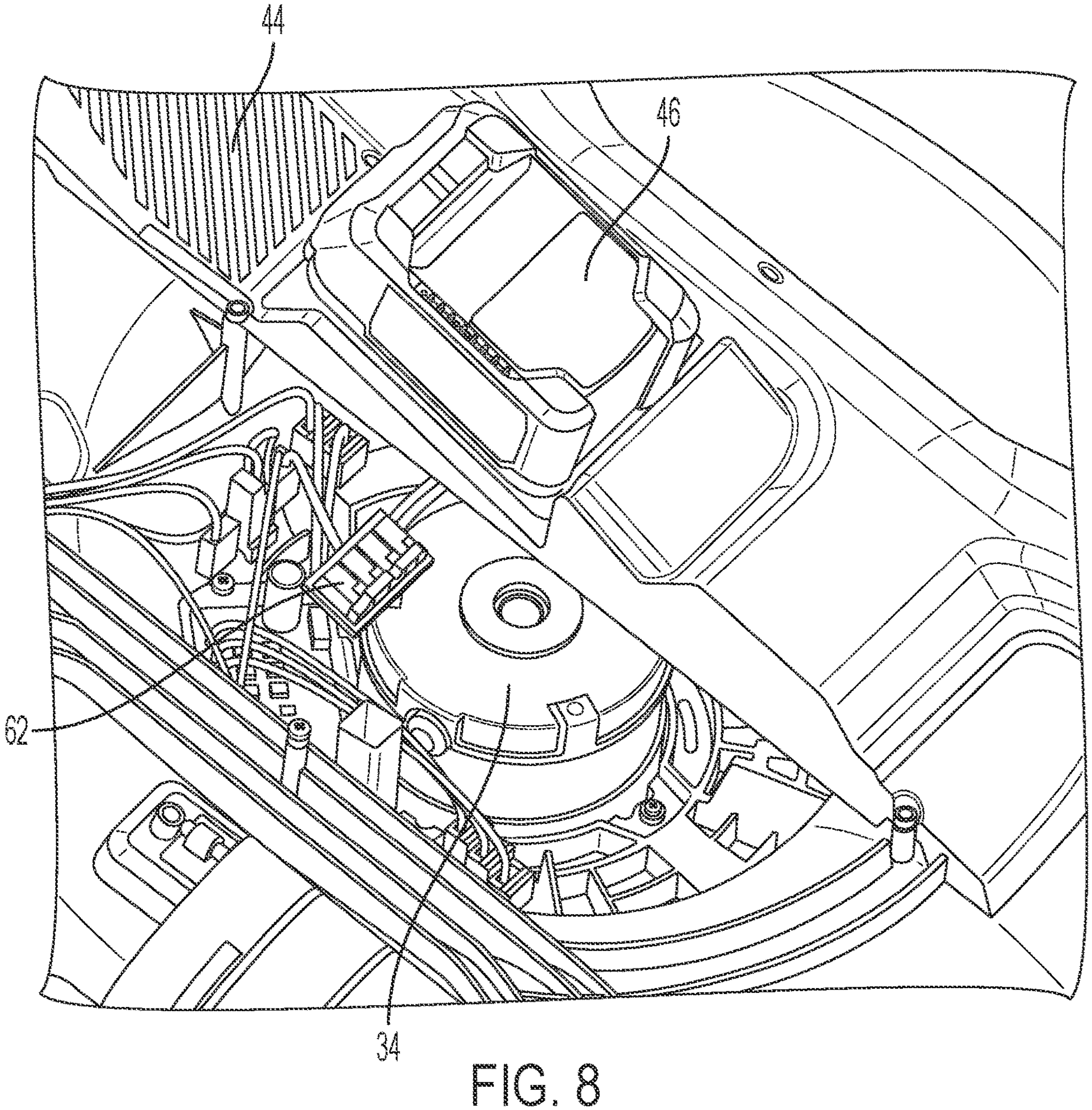
FIG. 8 is a close up view of FIG. 7.

FIG. 7 is another view of the mower showing the position of the motor 34 in the well of the deck 12, and the position of the battery 46 over the motor 34. FIG. 8 is a closeup view of the motor 34 and battery 46 of FIG. 7.

Figure 12:
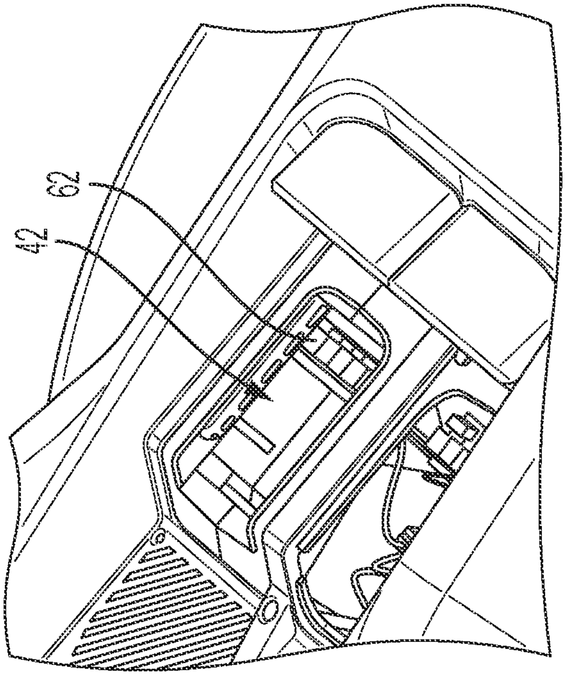
FIGS. 11-13 show the battery connector's attachment to the housing.
Figure 11:
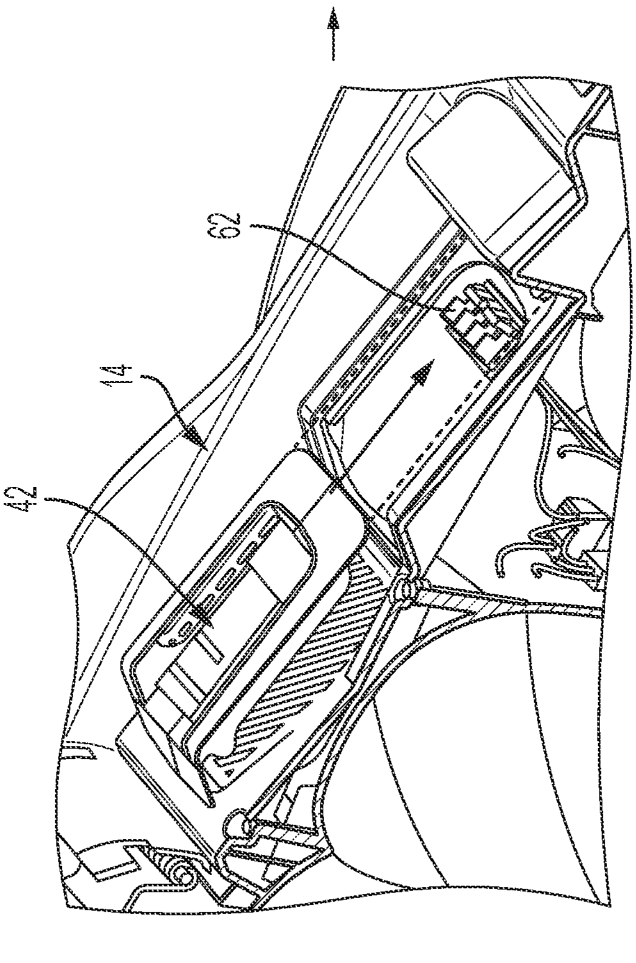
Figure 13:
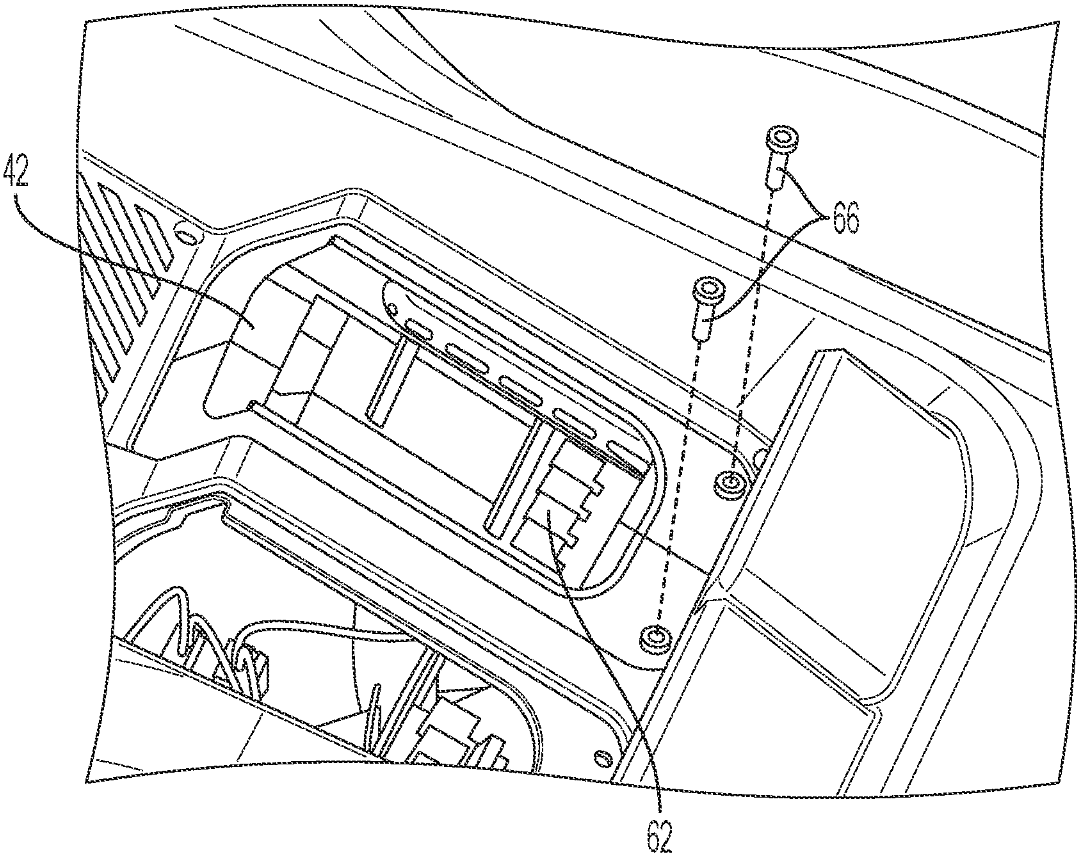

Referring now to FIG. 10, the battery connector 42 is made up of two plates 60 that capture a terminal block 62. Using the battery connector 42 subassembly improves the manufacturing and assembly of the mower since molding a separate battery connector for holding the terminal block is easier than molding this feature into the deck or housing. The plates 60 are held together with two screws 64. Once assembled, the battery connector 42 is slid into the opening 40 in the housing 14 (see FIGS. 11 and 12), and then secured in place by screws 66 (see FIG. 13).

Figure 15:
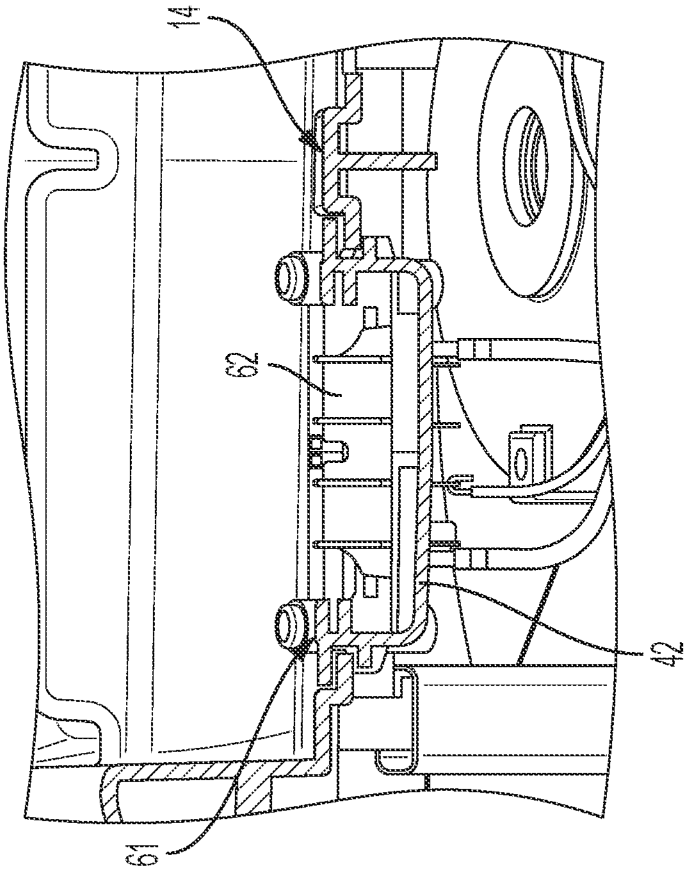
FIG. 15 is a sectional view along lines 15-15 of FIG. 14 showing the battery connector.
Figure 14:
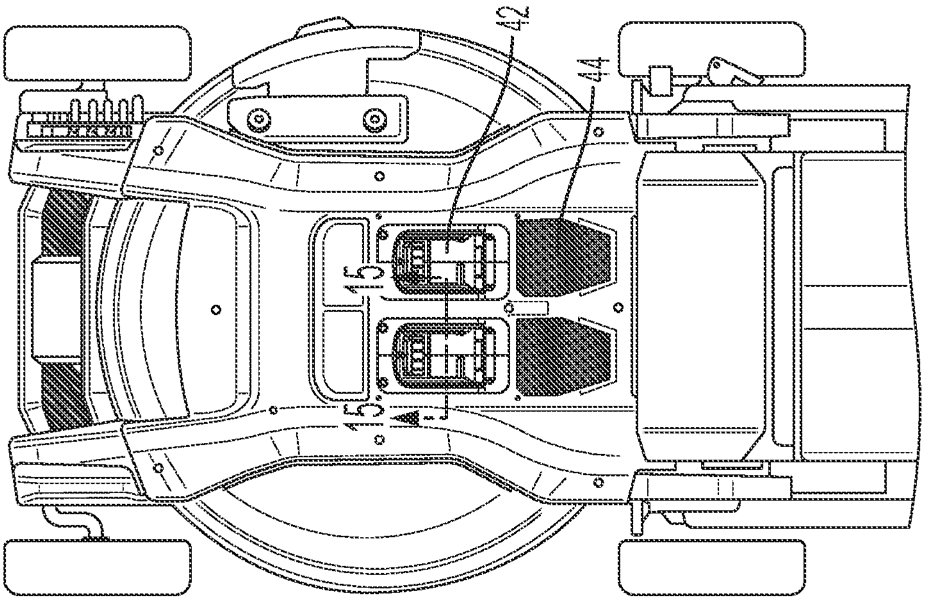
FIG. 14 shows a top view of the mower.

FIG. 14 is a top view of the mower showing the sectional line for FIG. 15. FIG. 15 shows the rail 61 for the battery connector 42 that aligns with groove 63 in the housing 14 for holding the battery connector 42. The battery connector 42 also includes an opening allowing the contacts for the terminal block 62 to extend through for connection with the battery 46.

Using a rail 61 and groove 63 structure allows the battery connector 42 to support greater weights since the load is distributed along the length of the rail 61. This can be an issue since user's often place heavy objects on top of the mower. The screws 66 are used to simply hold the battery connector 42 in place and keep it from sliding backward, and are not needed to support the weight of the battery connector 42.

Furthermore, an embodiment of the invention shows that the battery connector 42 does not have a cover for the batteries 14. This further minimizes the height of the mower and the amount of plastic or other materials needed. It also decreases the number of steps needed to insert or remove the batteries.

Figure 16:
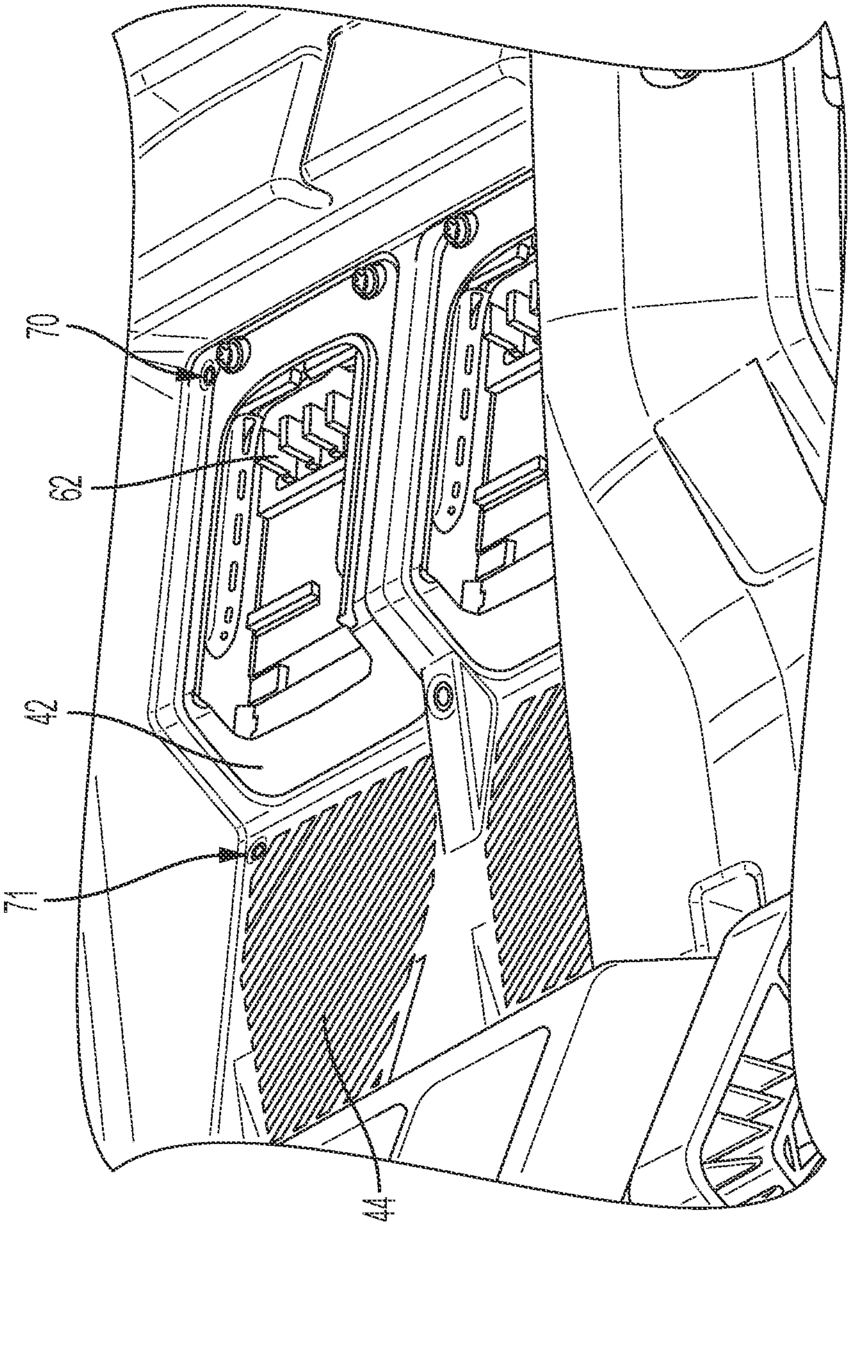
FIGS. 16 and 17 shows the housing with the drain holes.
Figure 17:
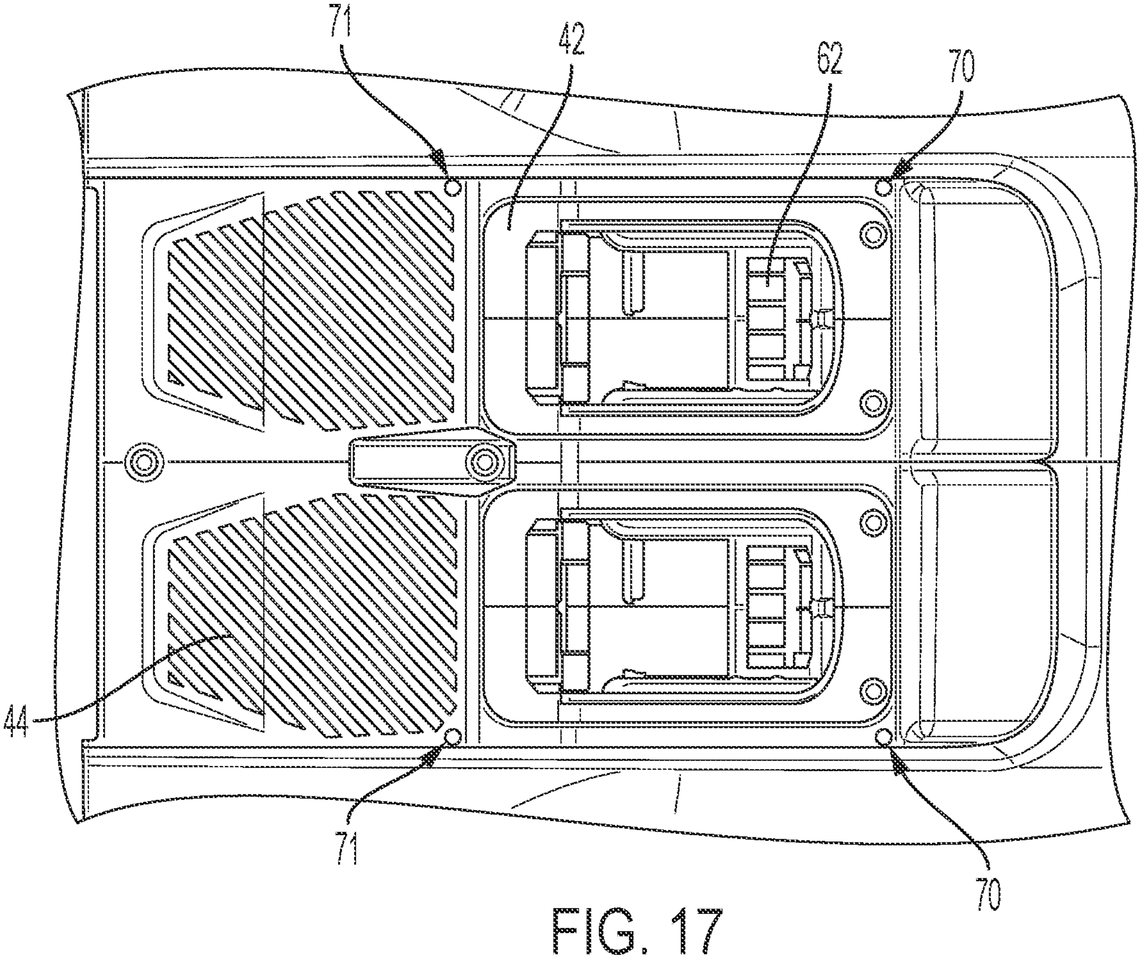

However, without a cover, the batteries are exposed to the elements, and if it rains, small amounts of water may collect in the battery connector 42 and access pads 44. Because the battery connector 42 and access pad 44 are angled, any water flows to the bottom front portion of the two areas, and drainage holes are provided in these locations. Furthermore, the center of the battery connector 42 and access pads 44 are slightly raised so that any water flows outwardly away from the center. FIGS. 16 and 17 show front drainage holes 70 and rear drainage holes 71 in the housing 14 in the area of the battery connector 42 and access pad 44, respectively.

Figure 18:
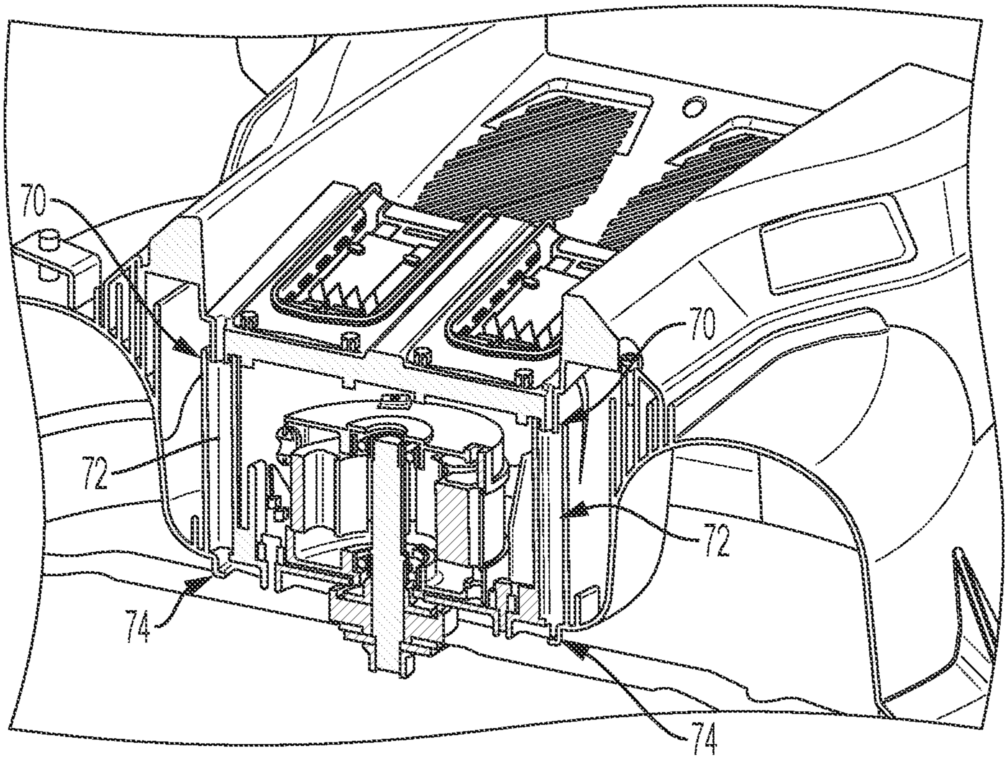
FIG. 18 is a sectional view of the mower showing the drain channel.
Figure 20:
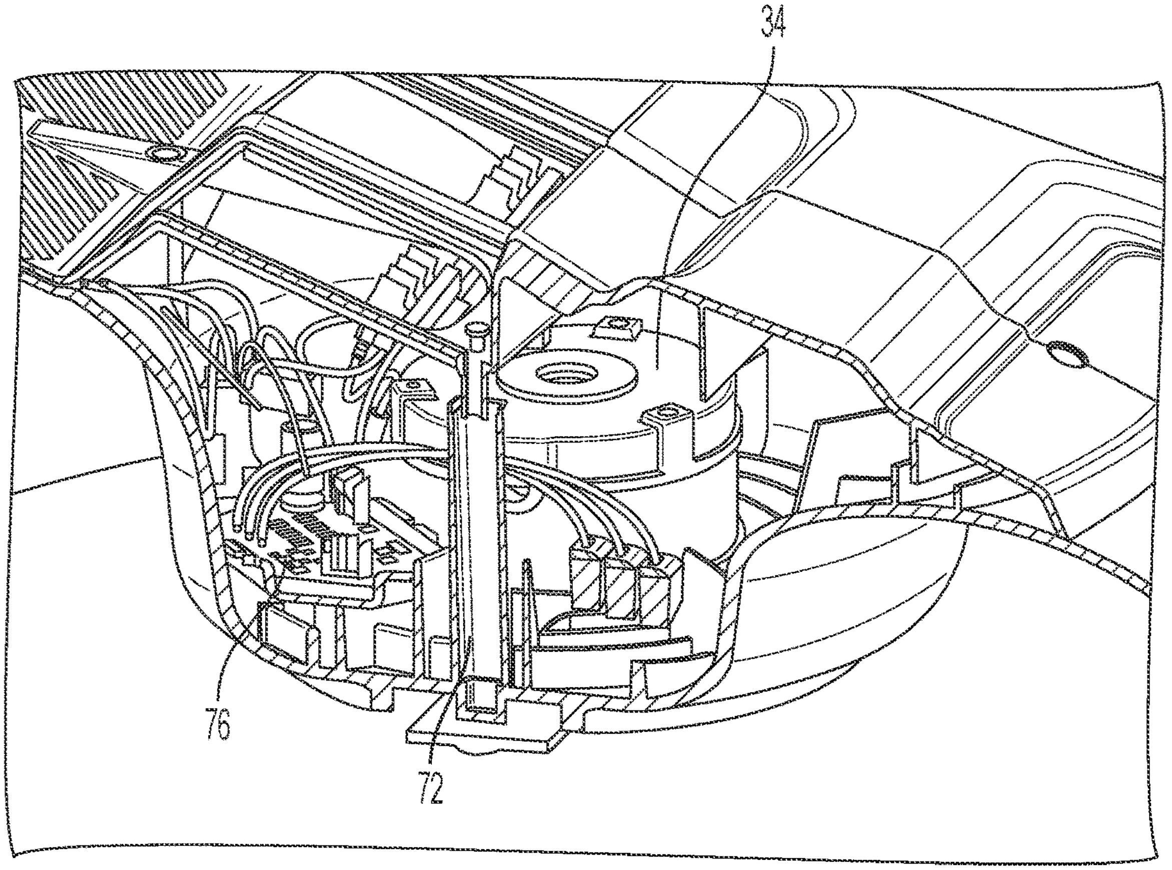
FIG. 20 is a sectional view of the mower showing the drain channel.
Figure 21:
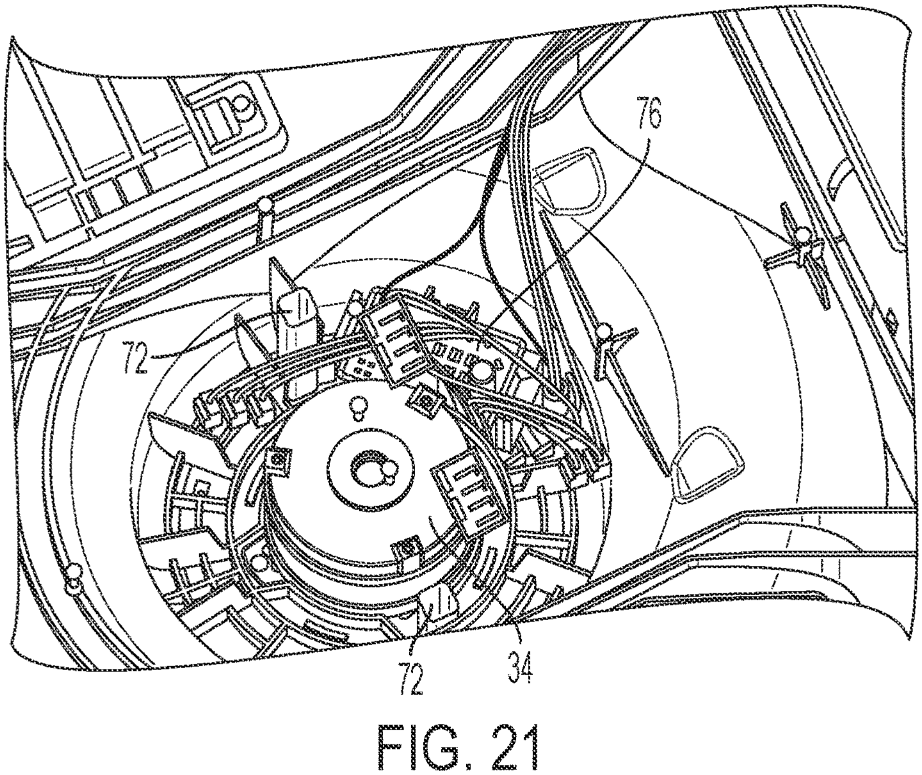
FIG. 21 is a top view of the mower showing the drain channel.

FIGS. 18, 20 and 21 shows the front drainage holes 70 connected to channels 72 formed in the deck 12 of the mower. The channels 72 carry the water from the housing 14 through the deck and out through an opening 74 in the bottom of the deck. The channel 72 is isolated from the rest of the deck, and importantly, from any electronics contained within. For example FIG. 20 shows the motor control PCB 76 is located adjacent the motor 34 and near the channel 72.

Figure 19:
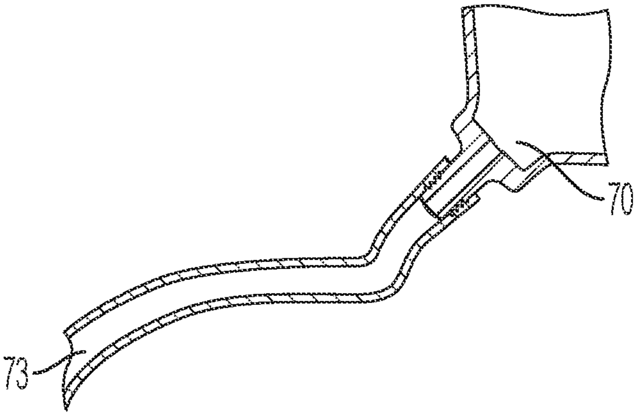
FIG. 19 is an alternate embodiment showing a flexible drain tube.

In another embodiment of the mower, the channels 72 can be made of a flexible plastic tubing, which may simplify the injection molding of the deck. This is shown in FIG. 19 as reference numeral 73. Here, as in the previous embodiment, the channels 73 transfer any water through the deck and out the opening 74.

Figure 22:
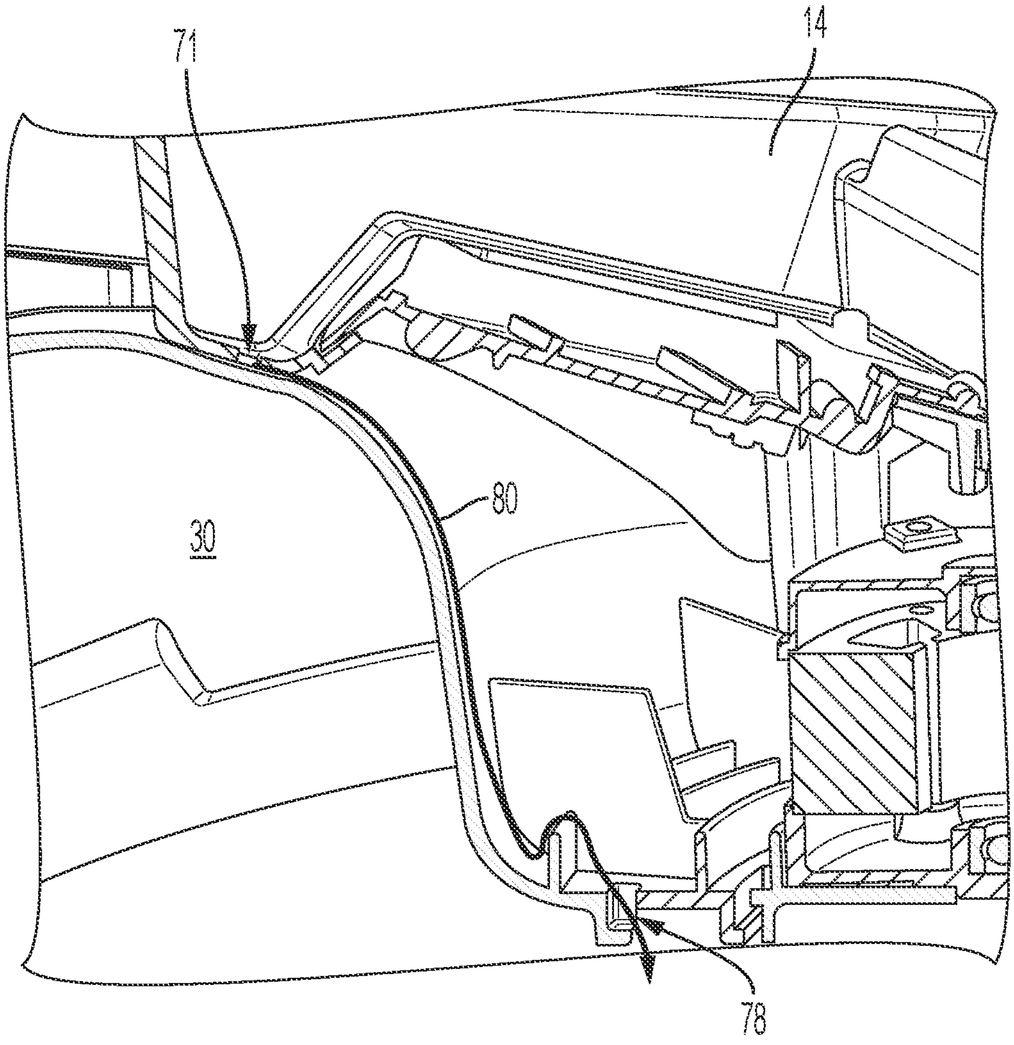
FIGS. 22-24 show the water pathway for the rear drainage hole.
Figure 24:
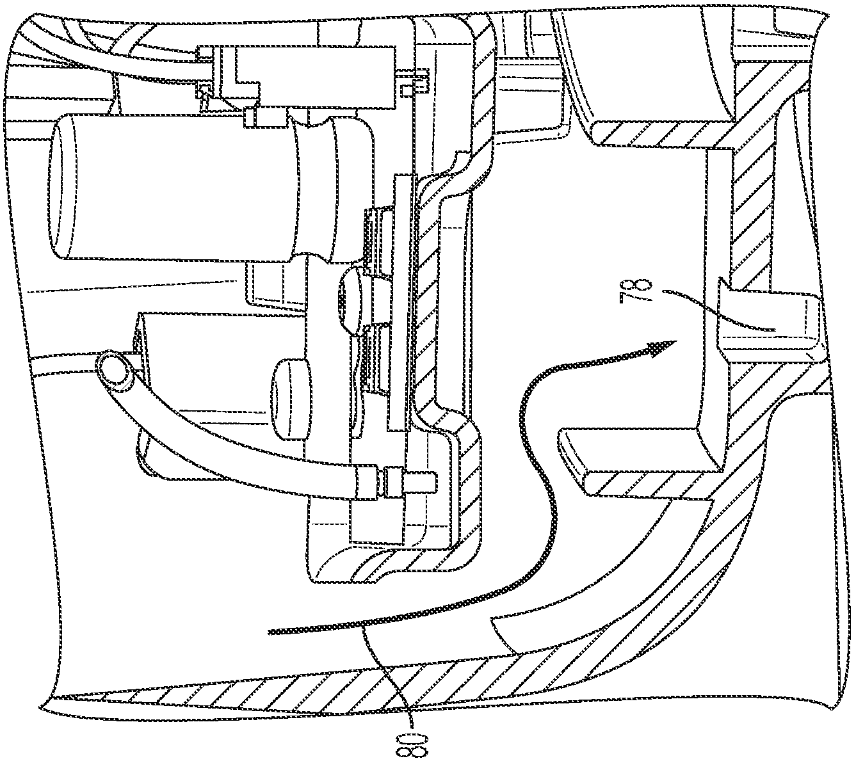
Figure 23:
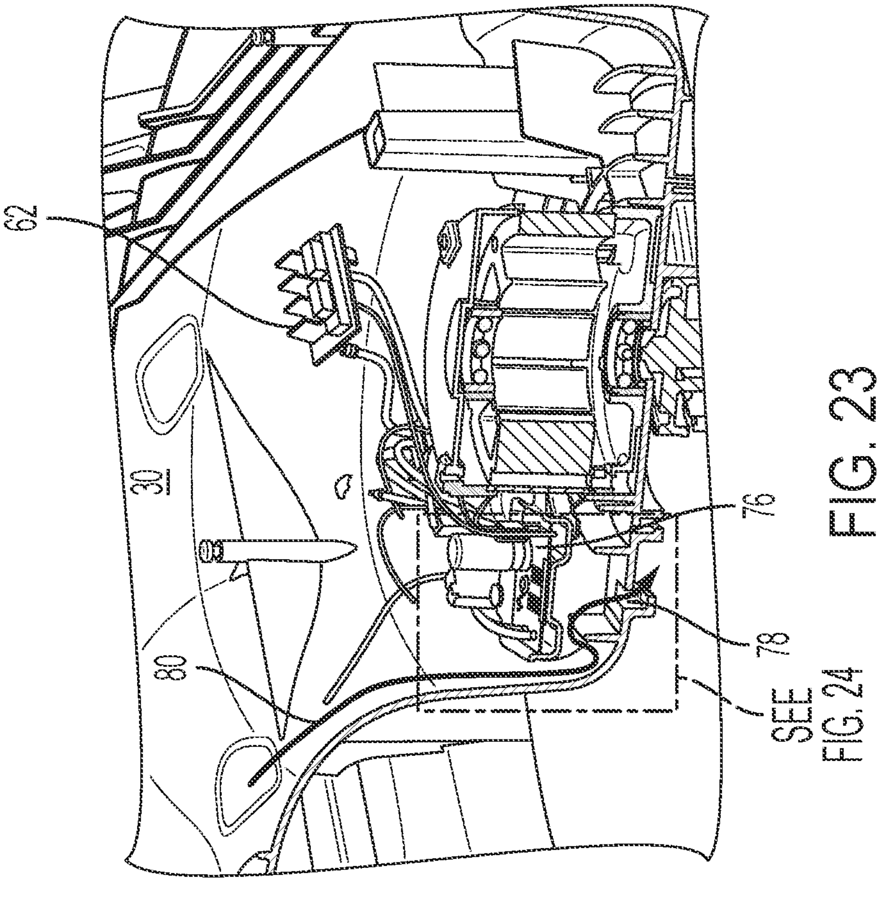

In an embodiment of the invention shown in FIGS. 22-24, the rear drainage holes 71 open to an interior surface of the volute 30. The water flows down the volute surface (as shown by the arrows 80) until it reaches an opening 78 in a bottom of the deck 12. FIG. 23 shows the location of the motor control PCB 76, which is spaced from the surface of the volute 30 to prevent water contacting the PCB 76.

Figure 25:
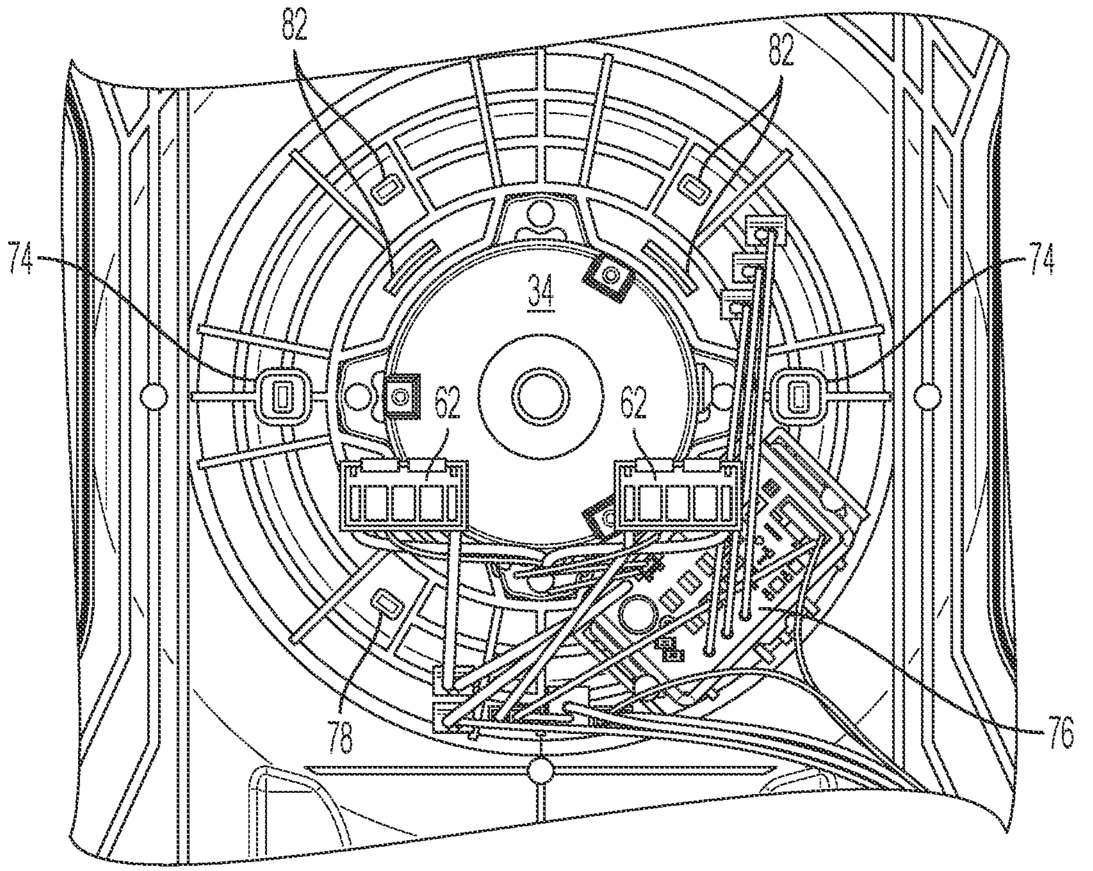
FIGS. 25 and 26 shows the drainage holes in the deck.
Figure 26:
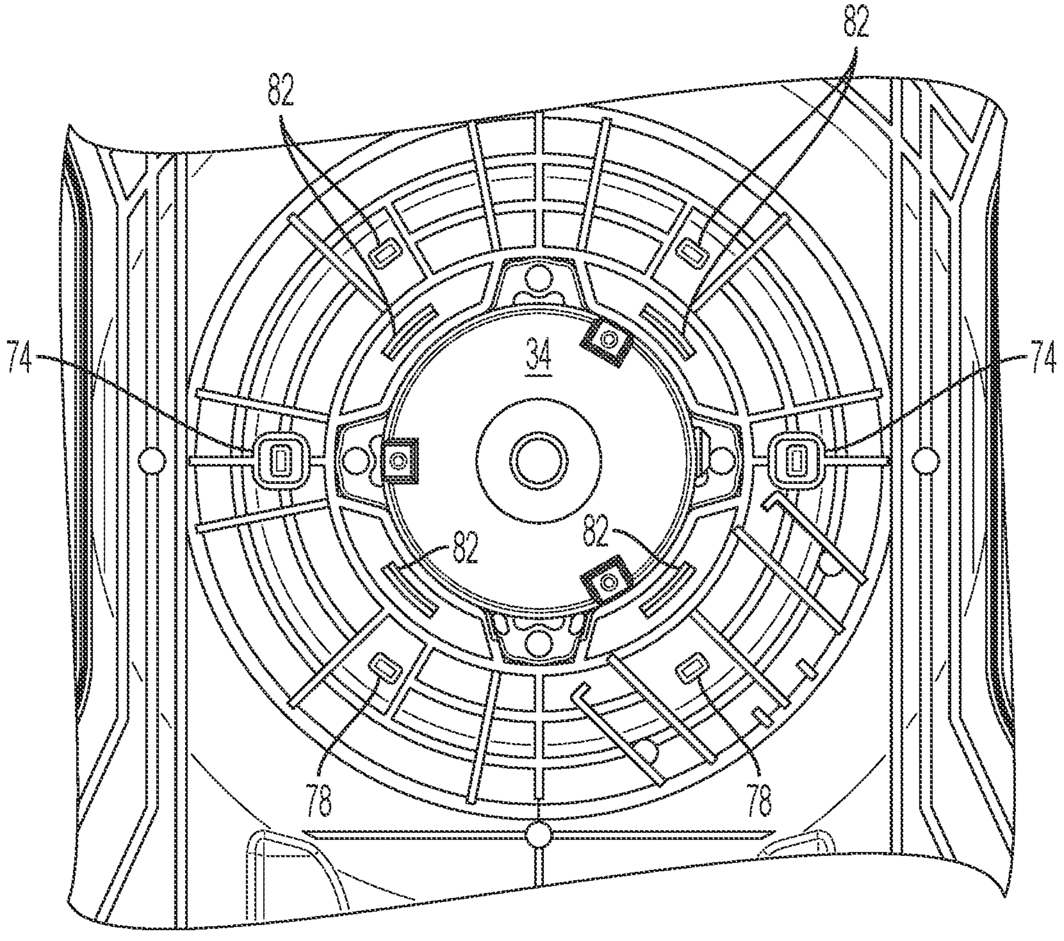

FIG. 25 is top view of the mower deck showing the position of the motor control PCB 76 and FIG. 26 is a top view with the PCB 76 and other wiring removed for clarity. It shows the two openings 74 on opposite sides of the deck for the front drainage hole 70, and two openings 78 for the rear drainage holes 71. Several additional ventilation and drainage holes 82 are provide around the deck.

In another feature of the invention, FIGS. 27-35 show an embodiment of the invention for assembling the rear door 16 to the mower. Traditionally, assembling the doors to the mower is time consuming and often fatigues factory workers because of the need to control the high tension door spring. The present invention pre-assembles the door to the housing before it is assembled to the deck, which alleviates these drawbacks.

Figure 27:
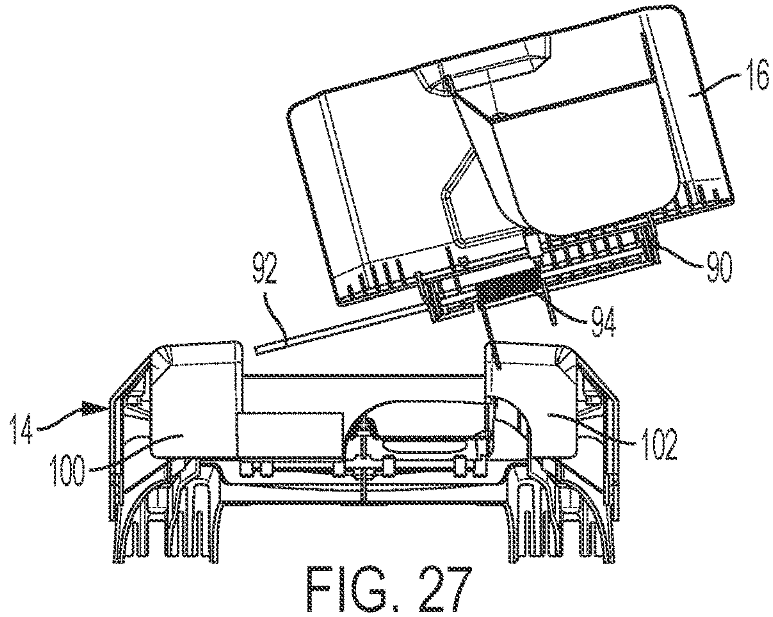
FIGS. 27-31 show the steps in securing the rear door to the housing.

FIG. 27 shows the rear door 16 having a bracket 90 for holding a rod 92. The rod 92 includes a high tension spring 94 to bias the door closed. The rod 92 and spring 94 are first inserted through holes within the ends of the bracket 90.

Figure 28:
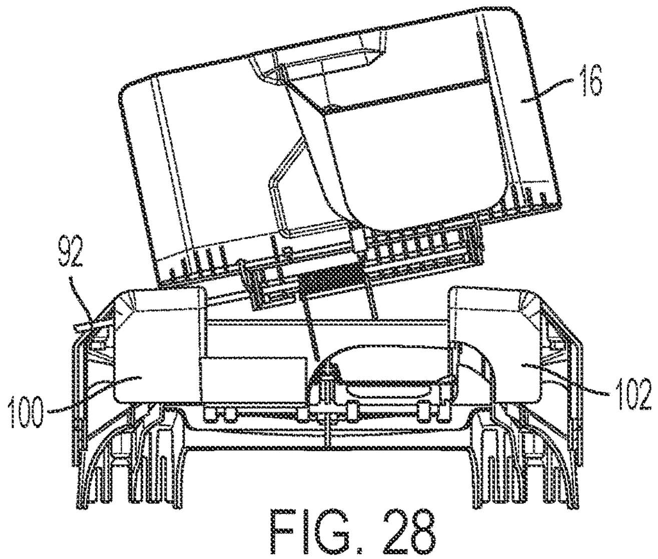
Figure 29:
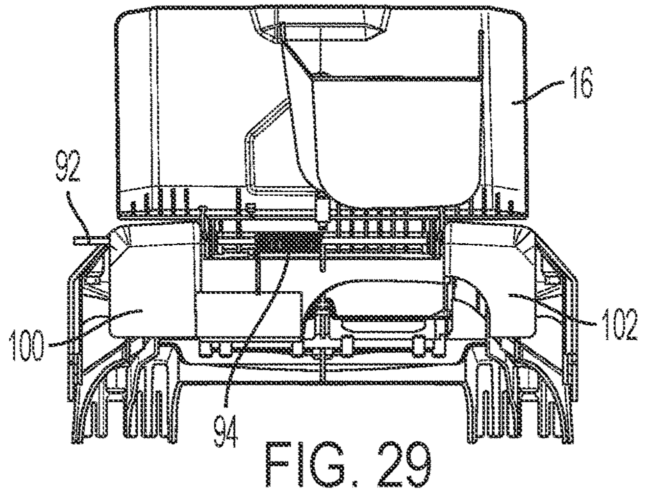
Figure 31:
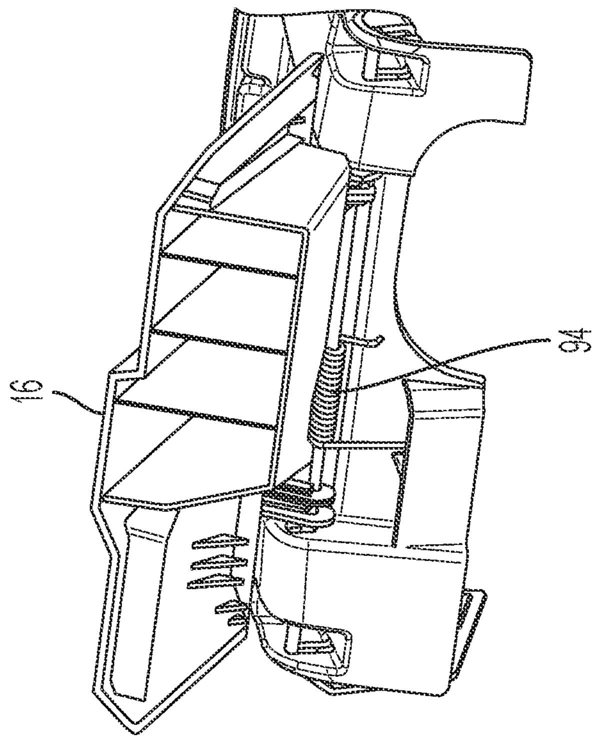
Figure 30:
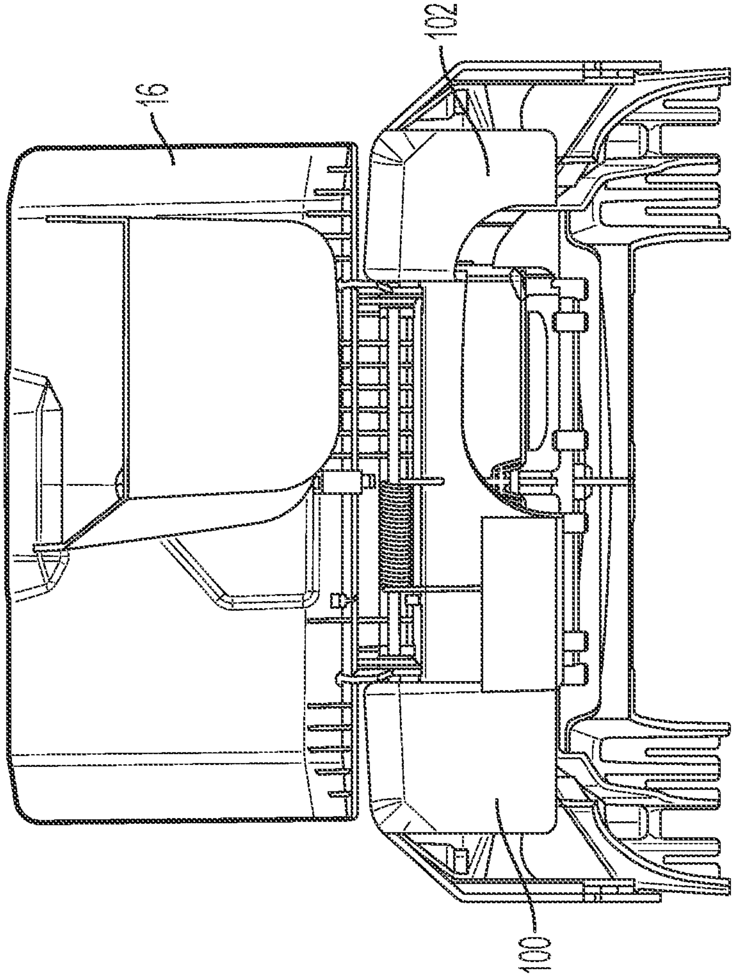
Figure 32:
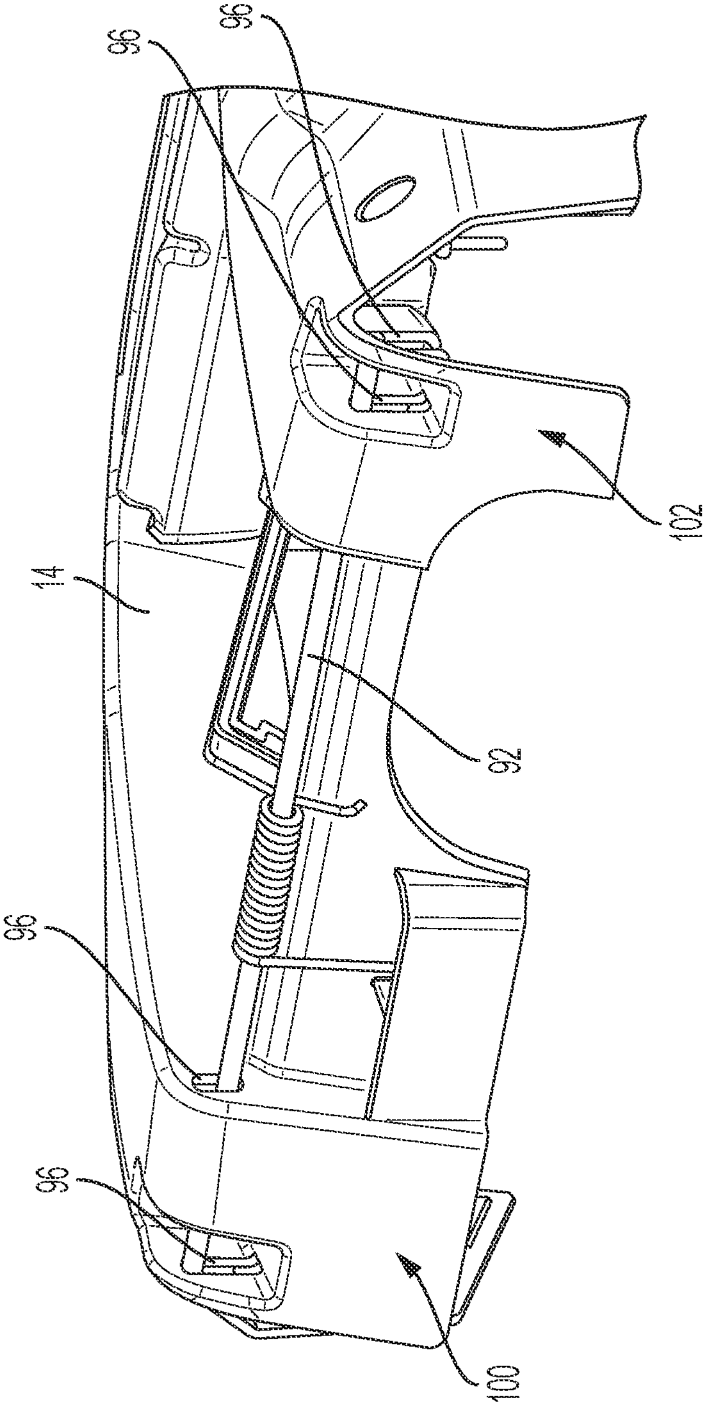
FIG. 32 shows the rod in the housing.
Figure 33:
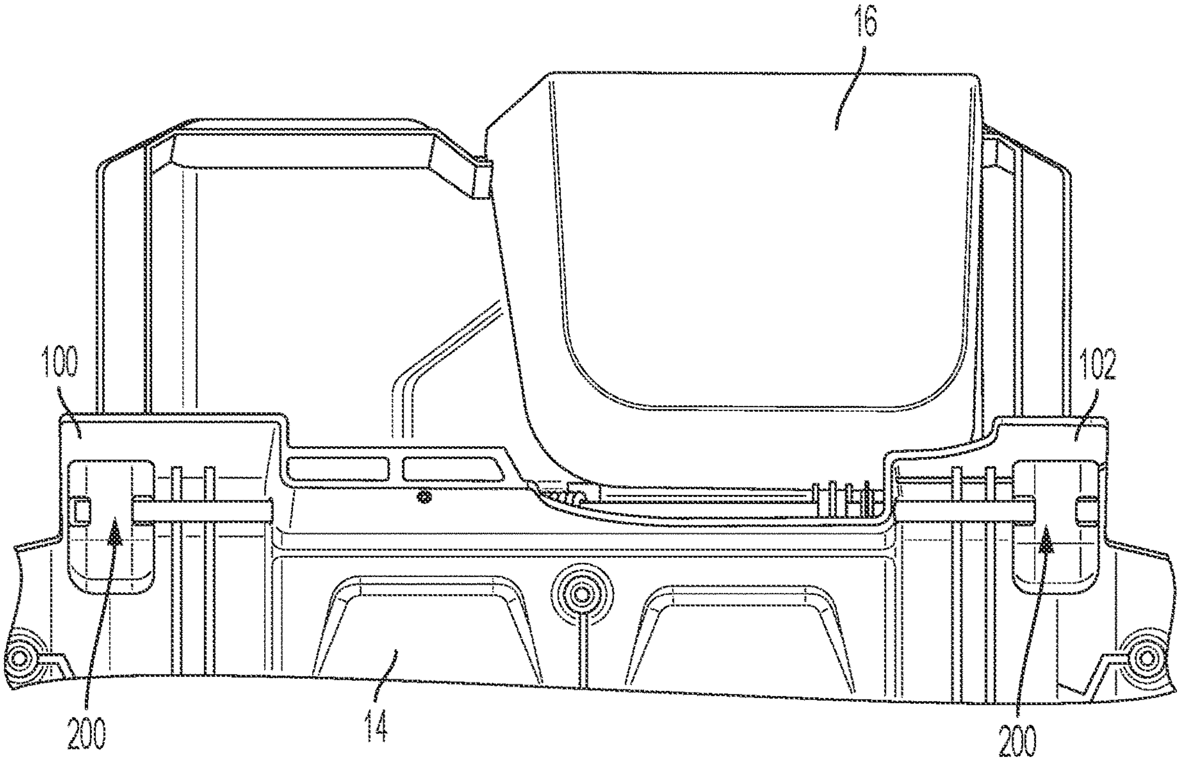
FIGS. 33-34 show the rear door connected to the housing.

A first end of the rod 92 is then inserted through a pair of elongated slots 96 (see FIG. 32) in a first arm 100 of the housing 14. Once the rod 92 is fully inserted, it can be angled down and inserted into a similar elongated slot 96 in a second arm 102, as shown in FIGS. 28 and 29. The rod 92 can then be centered to engage with both arms 100 and 102 as shown in FIGS. 30 and 31. FIG. 32 shows the rod 92 in the slots 96 (rear door 16 removed for clarity), and FIG. 33 shows a rear sectional view with portions of the arms 100 and 102 removed to better show the hubs 200 for holding the rod 92. The housing 14 now temporarily holds the rear door 16 while it is secured to the deck 12.

Figure 33A:
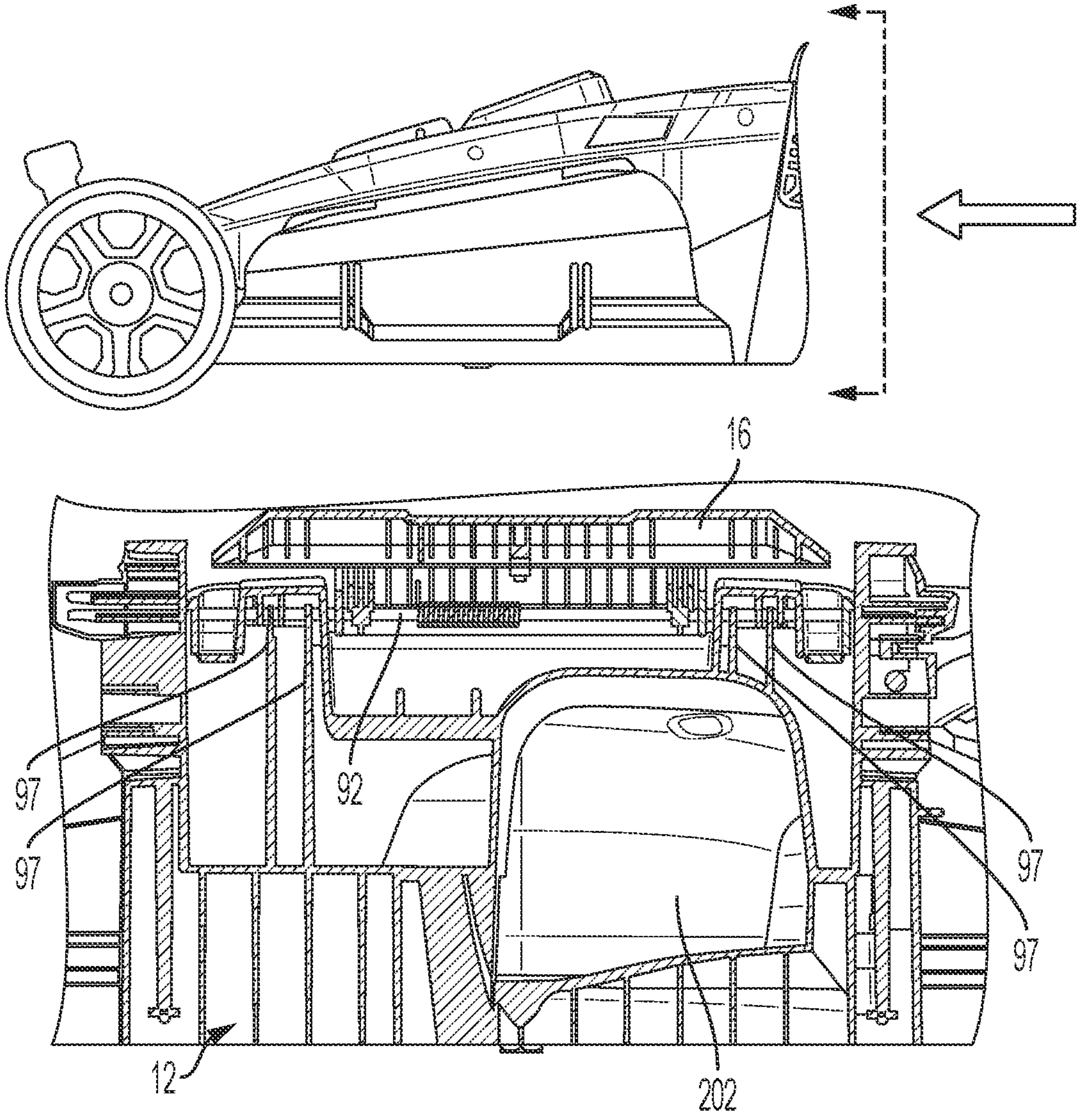
Figure 33B:
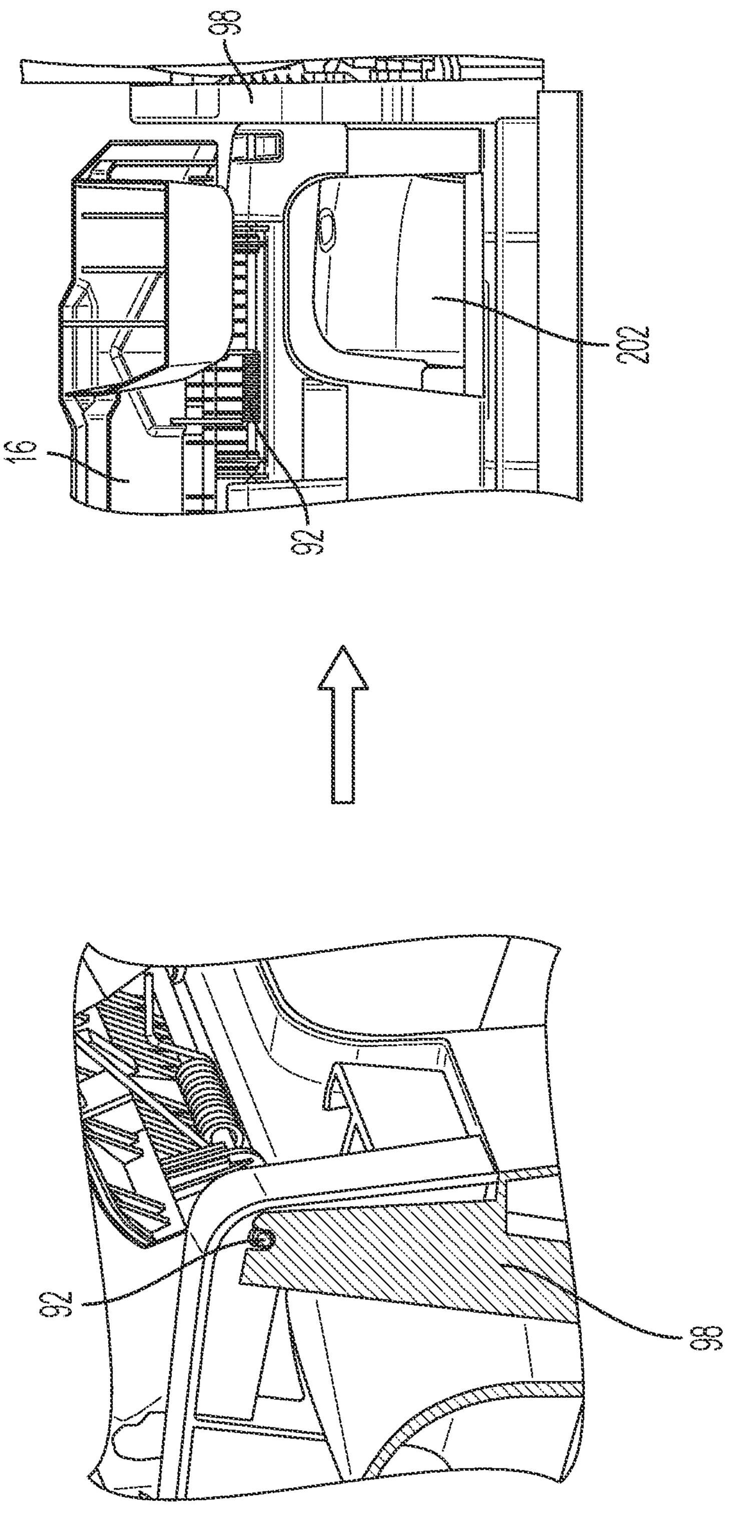
Figure 34:
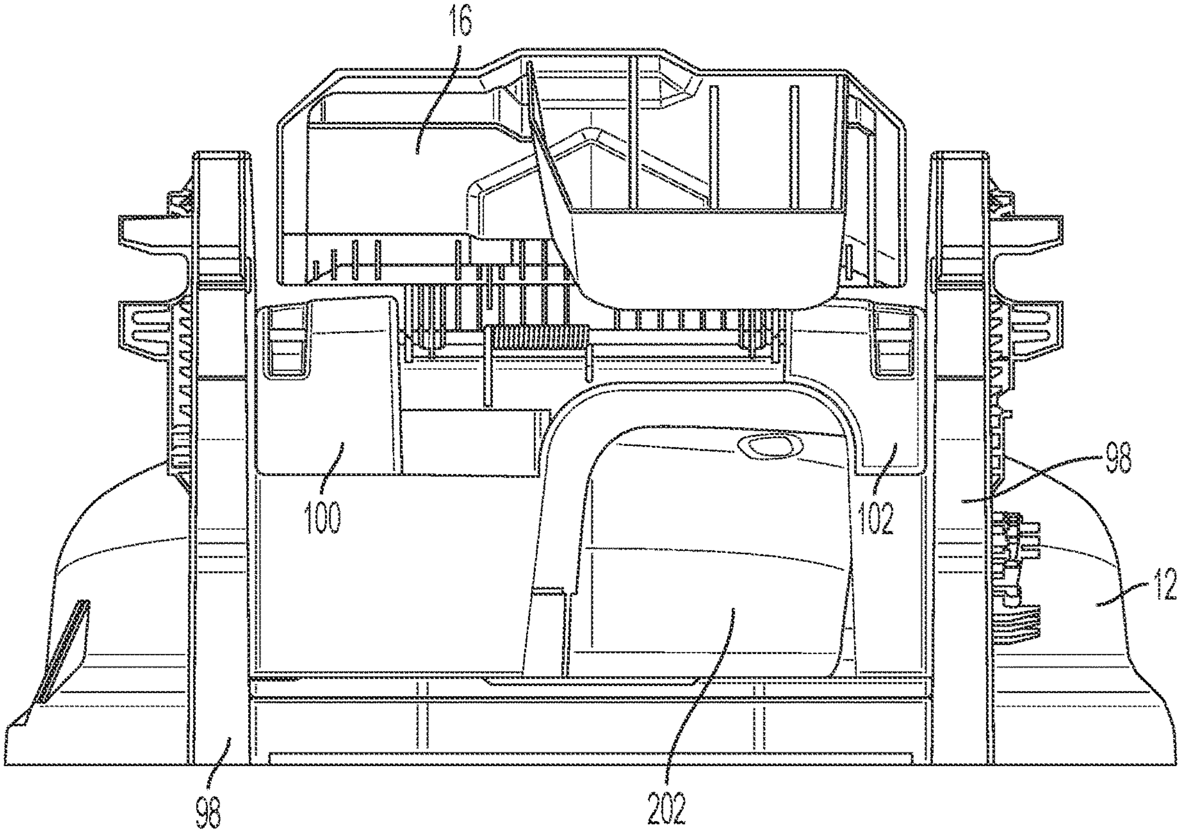
Figure 35:
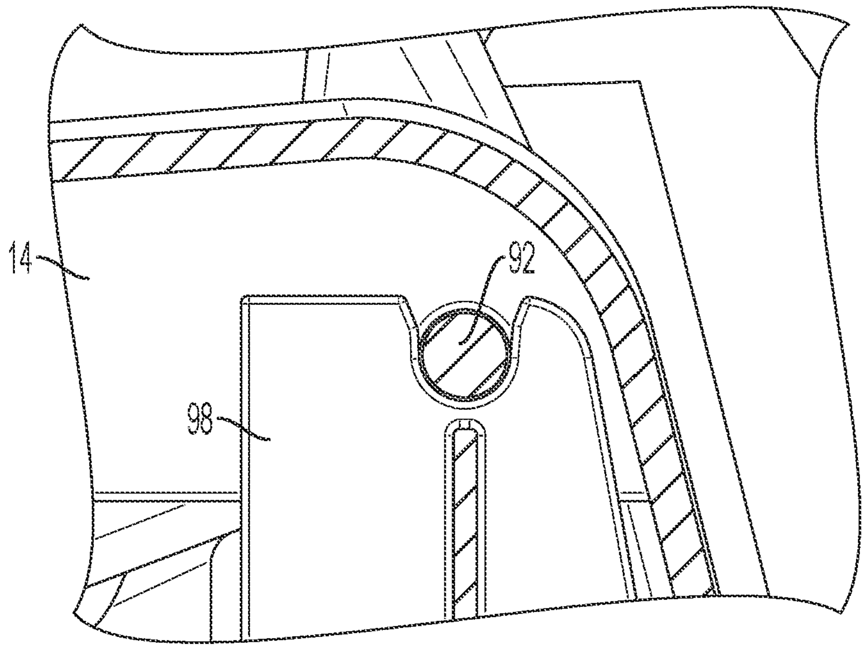
FIG. 35 is a side section view showing the housing and deck securing the rod.

FIG. 33A is rear sectional view showing the deck 12 having several pillars 97 that support the rod 92 as the housing 14 and rear door 16 are secured to the deck 12. The outer ends of the deck 14 have arms 98 that support the rod and keep it from moving laterally, eg. side-to-side when fully assembled.

Yet another feature of the invention is a cable routing system to protect the electrical wiring from damage. As shown earlier in FIGS. 1 and 2, an electrical cable 110 connects the motor 34 to a control unit 112 on an upper portion of the handle 18. The control unit 112 starts the motor 34 through the bail handle 114. It can also include a safety lockout key 115 which prevents the motor 34 from starting unless the key 115 is inserted.

In a typical mower, a cable generally exits the housing and/or deck around the lower end of the handle. The cable is typically run up the handle with plastic ties used to secure the cable to one of the handle arms. When the handle is folded over for storage, the handle end can pinch the cable and damage it.

Figure 36:
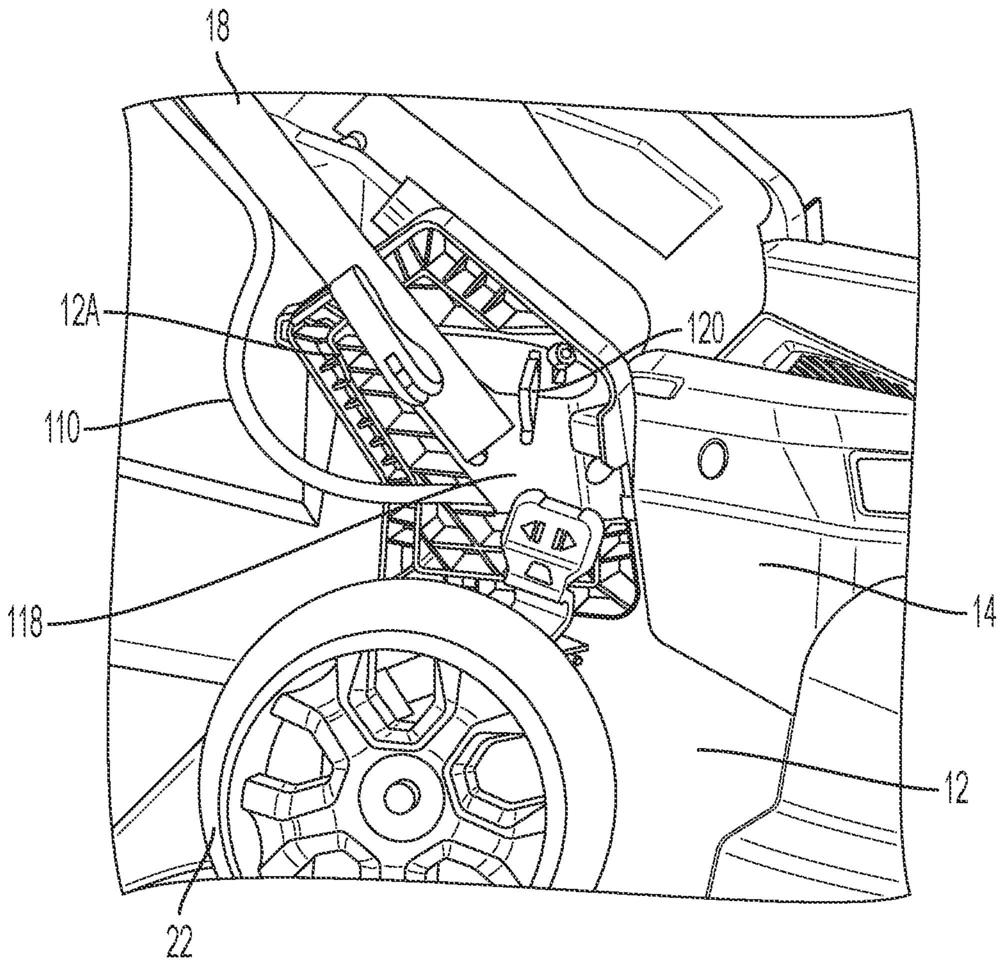
FIG. 36 shows a handle connected to the mower.
Figure 38:
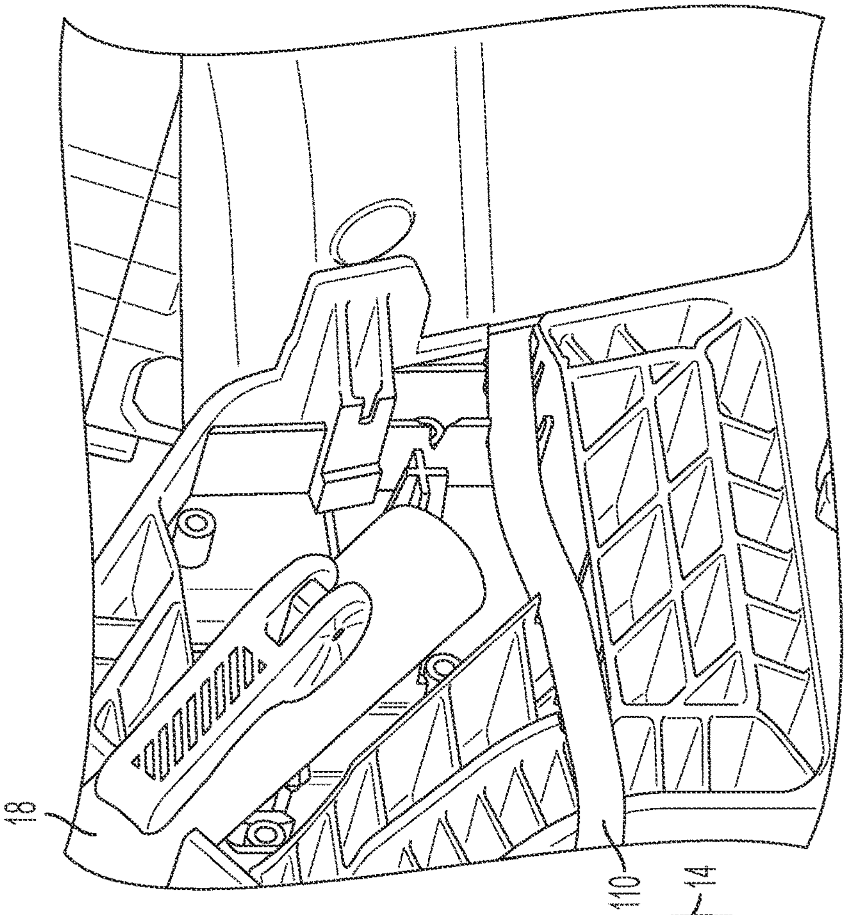
FIG. 38 is similar to FIG. 37, with a cable.
Figure 37:
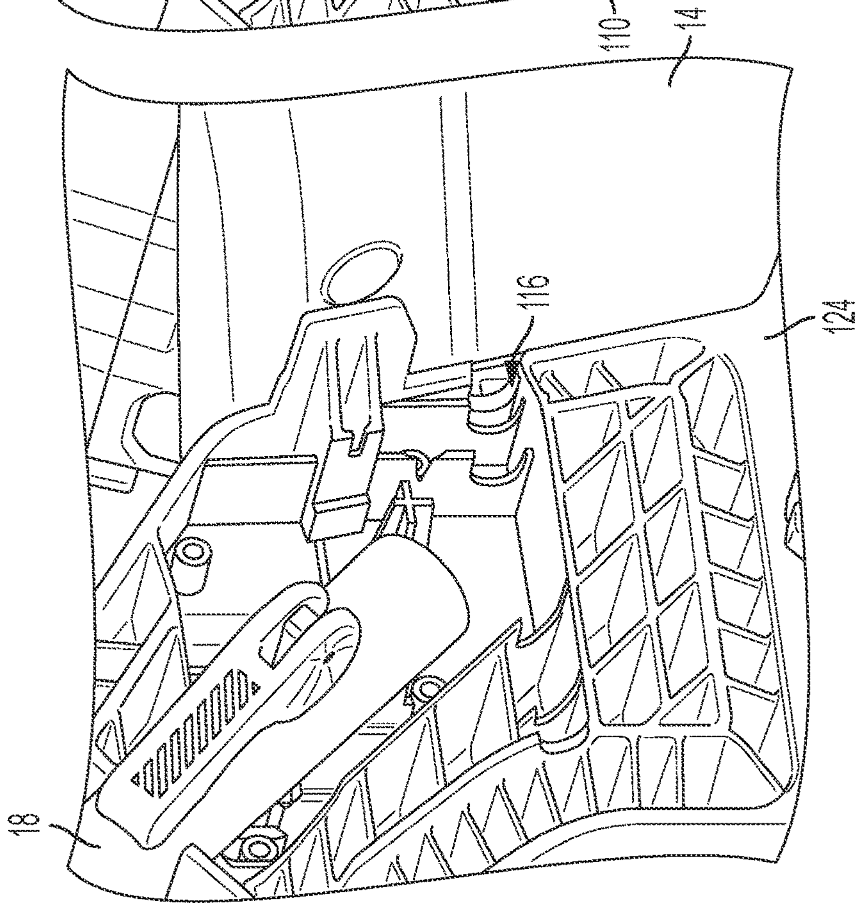
FIG. 37 shows the deck without a cable.
Figure 40:
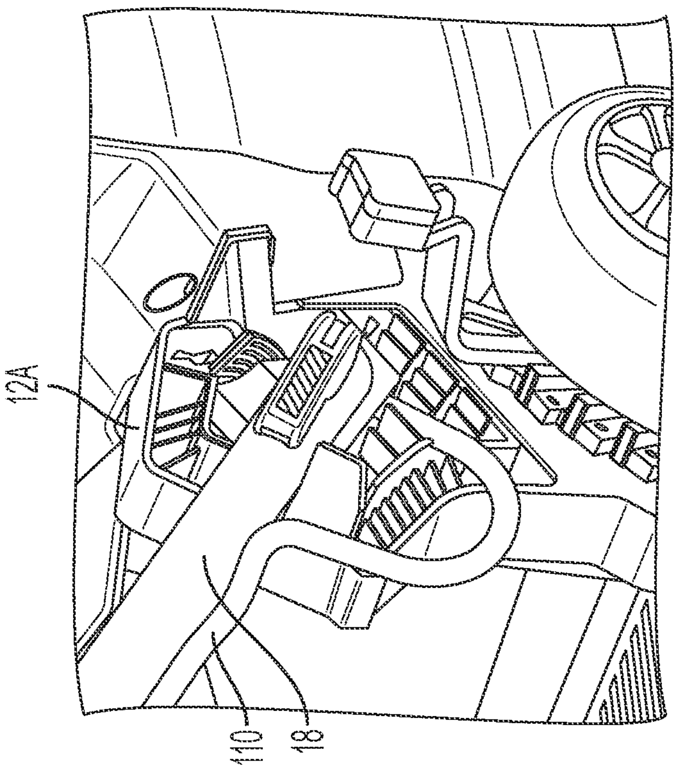
FIGS. 39 and 40 shows a rear view and perspective view of the deck and cable, respectively.
Figure 41:
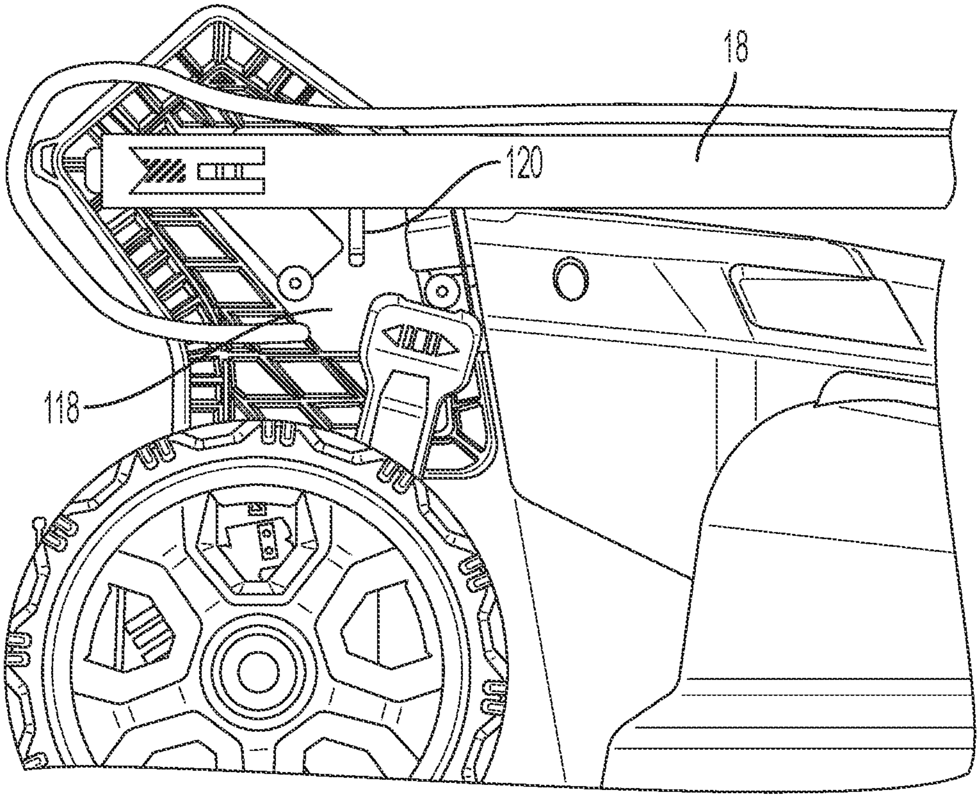
FIG. 41 shows the cable when the handle is folded.

FIGS. 36-39 show an embodiment of the present invention that uses a raised arm 12A of the deck 12 to divert the cable away from the handle. FIG. 36 shows the cable 110 being clamped against the raised arm 12A by a switch housing 118. FIG. 37 shows the arm 12A of the deck with the switch housing 118 removed. The arm 12A includes cutouts 116 for securing the cable 110 well below the end point of the handle 18 so that it does not pinch the cable 110. So when the handle 18 is folded, as shown in FIGS. 41, it does not pinch the cable 110. FIG. 36 shows the cable 110 when the handle is in the upright position, and FIG. 41 shows the cable 110 when the handle is folded.

Figure 39:
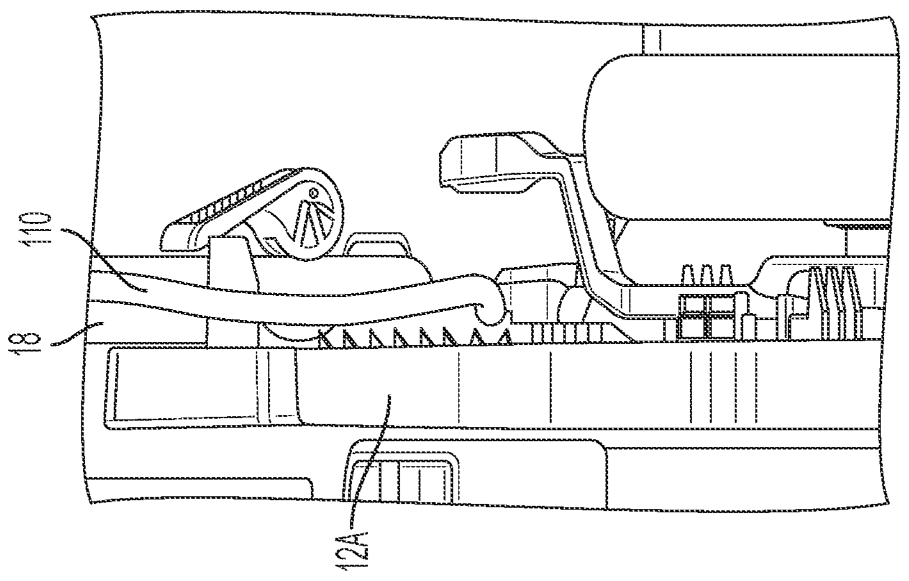

In another embodiment of the invention, the switch housing 118 includes a switch 120 that is actuated by the folding of the handle 18. FIG. 36 shows that the handle 18 does not contact the switch 120 when the handle is in the upright position. This allows the motor to be actuated in the normal course of use. FIG. 39 shows the handle 18 in the folded position where it engages the switch 120. When the switch 120 is actuated, it acts as a safety measure and prevents the motor from turning on.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An electric lawnmower, comprising:

a deck forming a circular volute, wherein the circular volute has a center cavity and an upper surface around a top of the center cavity;

a motor located in the center cavity of the circular volute of the deck, the motor to drive a cutting blade, wherein the motor is wholly contained within the center cavity of the circular volute of the deck in that a top of the motor is entirely below the upper surface around the top of the center cavity of the circular volute; and a housing placed over the deck, the housing having an upper surface wherein the upper surface a battery-connector pad to receive a battery pack, and an access pad located adjacent to the battery-connector pad, wherein, when the battery-connector pad receives the battery pack, the battery pack is disposed above the motor, and a bottom portion of the battery-connector pad extends at least partially into the center cavity of the circular volute, and wherein, at a location where the access pad meet the battery-connector pad, the access pad is formed lower than the battery-connector pad to create a space under the battery pack to provide access to a bottom of the battery pack.

2. The electric lawnmower of claim 1, wherein the motor has an output shaft directly connected to the cutting blade.

3. The electric lawnmower of claim 1, wherein the access pad has substantially a same surface size as the battery-connector pad.

4. The electric lawnmower of claim 1, wherein each of the battery-connector pad and the access pad is angled upward from a front to a rear of the electric lawnmower, and a lowest point of the access pad is below a highest point of the battery-connector pad.

5. The electric lawnmower of claim 1, wherein the battery pack is to be slid into engagement with the battery-connector pad.

6. The electric lawnmower of claim 1, wherein when the battery pack is inserted into the battery-connector pad, less than ½ of the battery pack extends above the housing.

7. The electric lawnmower of claim 1, wherein when the battery pack is inserted into the battery-connector pad, no portion of the battery pack extends above the housing.

8. The electric lawnmower of claim 1, wherein the upper surface of the housing includes drainage holes adjacent the battery-connector pad and the access pad.

9. The electric lawnmower of claim 8, wherein the battery-connector pad and the access pad are being angled to direct any fluids to the drainage holes.

10. An electric lawnmower comprising:

a deck forming a volute, wherein the volute has a cavity at a center of the volute and an upper surface around a top of the cavity;

a motor for powering a cutting blade, the motor located in the cavity of the volute, wherein the motor is wholly contained within the cavity of the volute in that a top of the motor is entirely below the upper surface around the top of the cavity of the volute;

a housing placed over the deck, the housing having an upper surface, wherein the upper surface of the housing includes:

battery-connector pads having grooves to receive battery packs, and access pads located adjacent to the battery-connector pads, wherein, when the battery-connector pads receive the battery packs, the battery packs are disposed above the motor, and bottom portions of the battery-connector pads extend at least partially into the cavity of the volute, and wherein, at locations where the access pads meet the battery-connector pads, the access pads are formed lower than the battery-connector pads to create an access space under the battery packs; and a handle extending rearwardly from the deck.

11. The electric lawnmower of claim 10, wherein the motor is centered above the cutting blade and has an output shaft directly connected to the cutting blade.

12. The electric lawnmower of claim 10, further comprising:

a rear door attached to the housing, wherein the housing, with the attached rear door, is attached to the deck.

13. The electric lawnmower of claim 10, wherein the battery-connector pads extend rearwardly from a front to a back of the electric lawnmower and the battery packs are to be slid into engagement with the grooves of the battery-connector pads.

14. The electric lawnmower of claim 10, wherein the access pads have substantially a same surface size as the battery-connector pads.

15. The electric lawnmower of claim 14, wherein the upper surface of the housing further includes drainage holes adjacent the battery-connector pads and the access pads, and the battery-connector pads and the access pads are angled to direct any fluids to the drainage holes.

16. The electric lawnmower of claim 10, wherein when the battery packs are inserted into the battery-connector pads, less than ½ of the battery packs extends above the housing.

17. The electric lawnmower of claim 10, wherein when the battery packs are inserted into the battery-connector pads, no portion of the battery packs extends above the housing.

* * * * *